(12) United States Patent
Kobayashi et al.

(10) Patent No.: US 11,884,790 B2
(45) Date of Patent: Jan. 30, 2024

(54) NEAR-INFRARED SHIELDING ULTRAFINE PARTICLE DISPERSION BODY, NEAR-INFRARED SHIELDING INTERMEDIATE FILM, NEAR-INFRARED SHIELDING LAMINATED STRUCTURE, AND METHOD FOR PRODUCING NEAR-INFRARED SHIELDING ULTRAFINE PARTICLE DISPERSION BODY

(71) Applicant: SUMITOMO METAL MINING CO., LTD., Tokyo (JP)

(72) Inventors: Hiroshi Kobayashi, Ichikawa (JP); Kennichi Fujita, Ichikawa (JP); Hirofumi Tsunematsu, Isa (JP); Takeshi Chonan, Isa (JP)

(73) Assignee: SUMITOMO METAL MINING CO., LTD., Tokyo (JP)

( * ) Notice: Subject to any disclaimer, the term of this patent is extended or adjusted under 35 U.S.C. 154(b) by 449 days.

(21) Appl. No.: 16/616,600

(22) PCT Filed: May 17, 2018

(86) PCT No.: PCT/JP2018/019109
§ 371 (c)(1),
(2) Date: Apr. 2, 2020

(87) PCT Pub. No.: WO2018/216595
PCT Pub. Date: Nov. 29, 2018

(65) Prior Publication Data
US 2020/0270401 A1 Aug. 27, 2020

(30) Foreign Application Priority Data
May 25, 2017 (JP) .................................. 2017-103971

(51) Int. Cl.
*C08J 3/02* (2006.01)
*C08K 3/22* (2006.01)
(Continued)

(52) U.S. Cl.
CPC ............... *C08J 7/043* (2020.01); *B32B 17/10* (2013.01); *B32B 17/10678* (2013.01);
(Continued)

(58) Field of Classification Search
CPC ...... C08J 3/02; C08K 3/22; C08K 2003/2258; C08K 2201/011; C08L 67/00;
(Continued)

(56) References Cited

U.S. PATENT DOCUMENTS 5,830,568 A    11/1998 Kondo
2006/0008640 A1    1/2006 Chonan et al.
(Continued)

FOREIGN PATENT DOCUMENTS

EP    2 404 752 A1    1/2012
JP    H08-259279 A    10/1996
(Continued)

OTHER PUBLICATIONS

Jing-Xiao Liu, Fei Shi, Xiao-Li Dong, Su-Hua Liu Chuan-Yan Fan, Shu Yin, Tsugio Sato, Morphology and phase controlled synthesis of CsxWO3 powders by solvothermal method and their optical properties,/ Powder Technology 270 (2015) 329-336. (Year: 2015).*
(Continued)

*Primary Examiner* — Bijan Ahvazi
(74) *Attorney, Agent, or Firm* — Oliff PLC

(57) ABSTRACT

A near-infrared shielding ultrafine particle dispersion body, and others, having excellent near-infrared shielding function, low haze value and excellent design, with suppressed change in color tone during outdoor use and blue haze phenomenon, using near-infrared shielding ultrafine par-
(Continued)

ticles transparent in visible light range, having excellent near-infrared shielding properties, and produced with high productivity, and a near-infrared shielding ultrafine particle dispersion body in which ultra-fine particles having near-infrared shielding properties are dispersed in solid medium, wherein the ultrafine particles are composite tungsten oxide ultrafine particles represented by general formula $M_xW_yO_z$, and have XRD peak top intensity ratio value of 0.13 or more based on XRD peak intensity ratio value of 1 on plane of silicon powder standard sample, and solid medium contains resin binder and weather resistance improver, and weather resistance improver includes at least one selected from benzotriazole-based UV absorber, triazine-based UV absorber, and benzophenone-based UV absorber.

17 Claims, 1 Drawing Sheet

(51) Int. Cl.

| | | |
|---|---|---|
| *C08L 67/00* | (2006.01) | |
| *C01G 41/02* | (2006.01) | |
| *C09D 5/32* | (2006.01) | |
| *B32B 17/10* | (2006.01) | |
| *C08J 7/043* | (2020.01) | |
| *B82Y 40/00* | (2011.01) | |

(52) U.S. Cl.
CPC .. *B32B 17/10761* (2013.01); *B32B 17/10788* (2013.01); *C01G 41/02* (2013.01); *C08J 3/02* (2013.01); *C08K 3/22* (2013.01); *C08L 67/00* (2013.01); *C09D 5/32* (2013.01); *B32B 2307/71* (2013.01); *B32B 2307/712* (2013.01); *B82Y 40/00* (2013.01); *C01P 2002/72* (2013.01); *C01P 2006/60* (2013.01); *C08K 2003/2258* (2013.01); *C08K 2201/011* (2013.01)

(58) Field of Classification Search
CPC .......... C01G 41/02; C08D 5/32; B82Y 40/00; B32B 17/10678; B32B 17/10761; B32B 17/10788; C09D 5/32
See application file for complete search history.

(56) References Cited

U.S. PATENT DOCUMENTS

| | | |
|---|---|---|
| 2006/0178254 A1 | 8/2006 | Takeda et al. |
| 2010/0220388 A1* | 9/2010 | Suzuki ............. B32B 17/10174 359/359 |
| 2011/0248225 A1* | 10/2011 | Mamak ................. C04B 35/495 524/323 |
| 2011/0318578 A1 | 12/2011 | Hashimoto et al. |
| 2013/0128342 A1* | 5/2013 | Mitarai ............. B32B 17/10036 359/359 |
| 2017/0190593 A1* | 7/2017 | Sakai ..................... B01J 19/087 |
| 2018/0170021 A1* | 6/2018 | Machida ................. B32B 27/22 |
| 2018/0370813 A1* | 12/2018 | Tsunematsu .......... G02B 5/208 |
| 2019/0002708 A1 | 1/2019 | Tsunematsu et al. |

FOREIGN PATENT DOCUMENTS

| | | |
|---|---|---|
| JP | 2009-215487 A | 9/2009 |
| JP | 2010-17854 A | 1/2010 |
| JP | 2010-99979 A | 5/2010 |
| JP | 2010-265144 A | 11/2010 |
| JP | 2012-532822 A | 12/2012 |
| WO | 2005/037932 A1 | 4/2005 |
| WO | 2005/087680 A1 | 9/2005 |
| WO | 2012/008587 A1 | 1/2012 |
| WO | 2017/002763 A1 | 1/2017 |
| WO | 2017/104854 A1 | 6/2017 |

OTHER PUBLICATIONS

Nov. 26, 2019 International Preliminary Report on Patentability issued in International Patent Application No. PCT/JP2018/019109.
May 3, 2021 extended Search Report issued in European Patent Application No. 18806280.6.
Aug. 7, 2018 International Search Report issued in International Patent Application No. PCT/JP2018/019109.

* cited by examiner

NEAR-INFRARED SHIELDING ULTRAFINE PARTICLE DISPERSION BODY, NEAR-INFRARED SHIELDING INTERMEDIATE FILM, NEAR-INFRARED SHIELDING LAMINATED STRUCTURE, AND METHOD FOR PRODUCING NEAR-INFRARED SHIELDING ULTRAFINE PARTICLE DISPERSION BODY

TECHNICAL FIELD

The present invention relates to a near-infrared shielding ultrafine particle dispersion body having good visible light transmittance and absorbing light in a near-infrared region, a near-infrared shielding intermediate film using the near-infrared shielding ultrafine particle dispersion body, a near-infrared shielding laminated structure using the near infrared shielding intermediate film, and a method for producing the near-infrared shielding ultrafine particle dispersion body, and more specifically, a near-infrared shielding ultrafine particle dispersion body widely applied to window materials of buildings, window materials of cars, trains, aircraft, etc., having optical properties such as an excellent near-infrared shielding function, and improved in color change during outdoor use, a near-infrared shielding intermediate film using the near-infrared shielding ultrafine particle dispersion body, a near-infrared shielding laminated structure using the near infrared shielding intermediate film, and a method for producing the near-infrared shielding ultrafine particle dispersion body.

DESCRIPTION OF RELATED ART

Various techniques have been proposed as a heat ray shielding technique that absorbs heat ray while maintaining good visible light transmittance and transparency. For example, the heat ray shielding technique using a dispersion body of conductive fine particles has a merit that it has excellent heat ray shielding properties at a low cost, radio wave transparency, and high weather resistance, compared with other techniques.

For example, patent document 1 discloses a laminated glass including an interlayer in which a single substance of metals of Sn, Ti, Si, Zn, Zr, Fe, Al, Cr, Co, Ce, In, Ni, Ag, Cu, Pt, Mn, Ta, W, V, Mo, oxides of them, nitrides of them, sulfides of them, or Sb or F doped substance, or a composite substance comprising at least two or more selected from them, or a mixture containing the single substance or the composite substance and an organic resin material, or a coating product obtained by coating the single substance or the composite substance with the organic resin material, are dispersed.

However, according to study by the present applicant, it is found that in the laminated glass according to Patent Document 1, a large amount of particles having near infrared shielding performance are required to be added to ensure near-infrared shielding performance. It is also found that with an increase in the amount of particles having near-infrared shielding performance, there is a problem that visible light transmission performance is reduced.

On the other hand, it is also found that in order to solve the problem, when the addition amount of particles having near-infrared shielding performance is reduced, visible light transmission performance increases, but near-infrared shielding performance decreases this time, and therefore it is difficult to simultaneously satisfy near-infrared shielding performance and visible light transmission performance.

Under such a technical background, the present inventors disclose in Patent Document 2 a solar shielding laminated structure in which an interlayer with solar shielding performance is sandwiched between two glass sheets, the interlayer containing vinyl resin and composite tungsten oxide ultrafine particles represented by a general formula WyOz (where W is tungsten, O is oxygen, satisfying $2.0 < z/y < 3.0$) and/or composite tungsten oxide ultrafine particles represented by a general formula MxWyOz (where M is one or more elements selected from H, He, alkali metal, alkaline earth metal, rare earth element, Mg, Zr, Cr, Mn, Fe, Ru, Co, Rh, Ir, Ni, Pd, Pt, Cu, Ag, Au, Zn, Cd, Al, Ga, In, Tl, Si, Ge, Sn, Pb, Sb, B, F, P, S, Se, Br, Te, Ti, Nb, V, Mo, Ta, Re, W is tungsten, O is oxygen, satisfying $0.001 \le x/y \le 1$, $2.0 < z/y \le 3.0$).

The solar shielding laminated structure having the interlayer disclosed in Patent Document 2 is the solar shielding laminated structure with high solar shielding property, low haze value and low production cost. Further, the solar shielding laminated structure is the laminated structure in which an interlayer is sandwiched between two laminated plates selected from sheet glass and plastic, and at least one of the interlayer and the plastic contains fine particles having a solar shielding function. Then, form examples of the laminated plate are as follows: plate glass or the above-described plastic is used as it is, and the plastic is used by containing fine particles having a solar shielding function. There is also a multi-functional solar shielding structure as desired, as follows: an appropriate additive having effects such as UV cut, color tone adjustment, and the like can be freely and easily added to the intermediate film.

It is also found by the present inventors that the near-infrared shielding fine particle dispersion body containing the composite tungsten oxide ultrafine particles represented by the general formula MxWyOz shows high near-infrared shielding properties, and the solar transmittance is improved to less than 50% when the visible light transmittance is 70%. Especially, the near-infrared shielding fine particle dispersion body using composite tungsten oxide ultrafine particles having a hexagonal crystal structure employing at least one selected from specific elements such as Cs, Rb, and Tl as the M element, shows excellent near-infrared shielding properties, and the solar transmittance is improved to be less than 37% when the visible light transmittance is 70%.

The present inventors have obtained the above result, and have studied on applications to window glass and plasma display panels by applying hard coat treatment etc. to the near-infrared shielding fine particle dispersion body.

On the other hand, in these applications, high transparency (low haze value) is required along with near-infrared shielding properties, and therefore further reduction of a particle size of the composite tungsten oxide ultrafine particles was attempted for the purpose of reducing a haze value. Then, the haze value could be reduced by reduction of the fine particles.

The present applicant has disclosed the above result as Patent Document 3.

However, in the near-infrared shielding fine particle dispersion body in which the composite tungsten oxide ultrafine particles are dispersed, a phenomenon (so-called blue haze phenomenon) of discoloring to blue-white when irradiated with light such as sunlight or spotlight was confirmed. Because of this phenomenon, when the near-infrared shielding fine particle dispersion body containing the composite tungsten oxide ultrafine particles is used for a windshield of a vehicle or the like, there was a concern that when receiving sunlight, discoloring to blue-white occurs and the visibility would be poor, causing a safety problem. Further, when the composite tungsten oxide particles are used for window glass for building materials, there was a concern that an appearance would be spoiled due to occurrence of the blue haze phenomenon. Further, when the composite tungsten oxide ultrafine particles are used for a plasma display panel or the like, there was a concern that the occurrence of the blue haze phenomenon would greatly lower a contrast and impair vividness and visibility.

On the other hand, in Patent Document 4, a phenomenon of transmittance change is examined, which is accompanied by blue-white discoloration in a heat ray shielding film using a tungsten compound. Then, it is considered that when the film is used outdoors, etc., the tungsten compound is oxidized and deteriorated by being irradiated with sunlight, particularly ultraviolet rays, for a long time to produce pentavalent tungsten, thereby causing the blue-white discoloration. Then, Patent Document 4 proposes that discoloration can be prevented over a long period of time by using a benzophenone-based UV absorber among UV absorbers, together with the tungsten compound.

In Patent Document 5, it is found that although the discoloration of the tungsten compound to blue-white due to oxidative deterioration can be suppressed by adding the UV absorber to the tungsten compound, discoloration to yellow may occur when used for further long time. Therefore, it is considered that the discoloration is caused by deterioration of the UV absorber itself due to ultraviolet rays. Therefore, in order to obtain a heat ray shielding film with greatly suppressed discoloration, addition of UV absorbers to the film in combination is proposed, such as an UV absorber capable of cutting ultraviolet rays in a UV-A region and an UV absorber capable of cutting ultraviolet rays in a UV-B region.

On the other hand, the present applicants conducted a particle size distribution analysis on a composite tungsten oxide used as a near-infrared shielding material. Then, it is confirmed that even if an average particle size of the composite tungsten oxide ultrafine particles is decreased, coarse particles remain in a dispersion liquid of the fine particles, and it is found that blue haze phenomenon occurs due to Rayleigh scattering caused by remaining coarse particles, and improvement is difficult.

Based on the above finding, the present inventors conceive of a pulverizing dispersion treatment of charging slurry in which composite tungsten oxide powder disclosed in Patent Document 3 is mixed with a solvent and a dispersant, into a medium stirring mill together with the yttria-stabilized zirconia beads, and Pulverized and dispersed until a desired particle size is reached. Then, it is found that by removing the coarse particles from the near-infrared shielding material fine particles by performing the pulverizing dispersion treatment, a near-infrared shielding fine particle dispersion liquid and a near-infrared shielding dispersion body with suppressed blue haze phenomenon can be obtained, which was disclosed as Patent Document 6.

However, the particle size of the composite tungsten oxide powder used as the near-infrared shielding material in Patent Document 6 was as large as 1 to 5 µm. Therefore, in order to obtain a near-infrared shielding fine particle dispersion liquid capable of suppressing the blue haze phenomenon, it was necessary to pulverize the composite tungsten oxide powder for a long time using a medium stirring mill to make the particles fine. There was a concern that the long-time pulverization step might cause a low productivity of the near-infrared shielding fine particle dispersion liquid.

Here, the present applicant has further studied and conceived of an idea such that composite tungsten oxide ultrafine particles having a particle size of 100 nm or less is produced using a plasma reaction. As a result, by using the composite tungsten oxide ultrafine particles having a small particle size produced using the plasma reaction as a raw material, there is no need to perform a long-time pulverization treatment, and the near-infrared shielding ultrafine particle dispersion liquid can be produced at low cost, with high productivity.

The present applicant has disclosed the above result as Patent Document 7.

PRIOR ART DOCUMENT

Patent Document

[Patent Document 1] Japanese Patent Application Laid-Open No. 1996-259279
[Patent Document 2] International Publication No. WO 2005/087680
[Patent Document 3] International Publication No. WO2005/037932
[Patent Document 4] Japanese Patent Application Laid-Open No. 2010-17854
[Patent Document 5] Japanese Patent Application Laid-Open No. 2010-99979
[Patent Document 6] Japanese Patent Application Laid-Open No. 2009-215487
[Patent Document 7] Japanese Patent Application Laid-Open No. 2010-265144

SUMMARY OF THE INVENTION

Problem to be Solved by the Invention

However, as a result of further research by the applicant, it is found that although the particle size of the composite tungsten oxide ultrafine particles produced by the method disclosed in Patent Document 7 is as small as 100 nm or less, crystallinity of the ultrafine particles is low. From this finding, the present inventors have conceived of the fact that the near-infrared shielding property of the dispersion liquid using the composite tungsten oxide ultrafine particles can be further improved.

Under the above-described circumstance, the present invention is provided, and a problem to be solved is to provide a near-infrared shielding ultrafine particle dispersion body having a low haze value and excellent in design, with suppressed change in color tone and blue haze phenomenon during outdoor use, using near-infrared shielding ultrafine particles transparent in a visible light region, having excellent near-infrared shielding properties, and produced with high productivity, and a near-infrared shielding intermediate film using the near-infrared shielding ultrafine particle dispersion body, and a near-infrared shielding laminated structure using the near infrared shielding intermediate film, and a method for producing the near-infrared shielding ultrafine particle dispersion body.

Means for Solving the Problem

In order to solve the above subject, the present inventors have conducted intensive studies on a relationship between crystallinity of composite tungsten oxide ultrafine particles (hereinafter, sometimes referred to as "composite tungsten oxide ultrafine particles (A)" in the present invention) and near-infrared shielding performance. As a result, it is found that in an X-ray diffraction (hereinafter sometimes referred to as "XRD") pattern of the composite tungsten oxide ultrafine particles, the composite tungsten oxide ultrafine particles having a peak top intensity within a predetermined range, are transparent in the visible light region, and have excellent near-infrared shielding properties due to high crystallinity. Specifically, the present inventors found the composite tungsten oxide ultrafine particles described as "composite tungsten oxide ultrafine particles (A) in the present invention" having an XRD peak top intensity ratio value of 0.13 or more based on an XRD peak intensity ratio value of 1 on plane (220) of a silicon powder standard sample.

The composite tungsten oxide ultrafine particles (A) having the peak top intensity within a predetermined range are transparent in the visible light region and have excellent near-infrared shielding properties due to their high crystallinity, and a dispersion liquid containing the composite tungsten oxide ultrafine particles (A) can be produced with high productivity, and it is possible to produce a near-infrared shielding ultrafine particle dispersion body with low haze value and excellent in design while having excellent versatile excellent near-infrared shielding function, and a near-infrared shielding intermediate film using the near-infrared shielding ultrafine particle dispersion body, and a near-infrared shielding laminated structure using the near-infrared shielding intermediate film.

It is also found that in the dispersion liquid using the composite tungsten oxide ultrafine particles (A), by setting the dispersed particle size of the composite tungsten oxide ultrafine particles (A) to 200 nm or less, the blue haze phenomenon can be suppressed.

It is also found that the near-infrared shielding ultrafine particle dispersion body with suppressed change in color tone during outdoor use can be obtained, and the near-infrared shielding intermediate film and the near-infrared shielding laminated structure using the near-infrared shielding ultrafine particle dispersion body can be obtained, by dispersing the composite tungsten oxide ultrafine particles (A) in a solid medium containing a weather resistance improver having a specific structure (may be referred to as "weather resistance improver (C)" in the present invention), together with a resin binder (may be referred to as "resin binder (B)" in the present invention), and by optimizing their addition amount.

It is also found that the near-infrared shielding ultrafine particle dispersion body transparent in the visible light region and having excellent near-infrared shielding properties can be obtained, which is formed as a coating layer on a transparent substrate by processing the near-infrared shielding ultrafine particle dispersion body into a sheet, board, or film. It is also found that the near-infrared shielding laminated structure can be obtained, including the near-infrared shielding intermediate film in an interlayer sandwiched between two or more transparent substrates, using the near-infrared shielding ultrafine particle dispersion body as the near-infrared shielding intermediate film. Thus, the present invention is completed.

Namely, in order to solve the above-described subject, a first invention is a near-infrared shielding ultrafine particle dispersion body in which ultra-fine particles having near-infrared shielding properties are dispersed in a solid medium, wherein the ultrafine particles are composite tungsten oxide ultrafine particles (A) represented by a general formula $M_xW_yO_z$ (where M is one or more elements selected from H, He, alkali metal, alkaline earth metal, rare earth element, Mg, Zr, Cr, Mn, Fe, Ru, Co, Rh, Ir, Ni, Pd, Pt, Cu, Ag, Au, Zn, Cd, Al, Ga, In, Tl, Si, Ge, Sn, Pb, Sb, B, F, P, S. Se, Br, Te, Ti, Nb, V, Mo, Ta, Re, Be, Hf, Os, Bi, and I, W is tungsten, O is oxygen, satisfying $0.001 \leq x/y \leq 1$, $2.0 < z/y \leq 3.0$), and have an XRD peak top intensity ratio value of 0.13 or more based on an XRD peak intensity ratio value of 1 on plane (220) of a silicon powder standard sample, and the solid medium contains a resin binder (B) and a weather resistance improver (C), and the weather resistance improver (C) includes at least one selected from a benzotriazole-based UV absorber, a triazine-based UV absorber, and a benzophenone-based UV absorber.

A second invention is the near-infrared shielding ultrafine particle dispersion body according to the first invention, wherein a dispersed particle size of the composite tungsten oxide ultrafine particles (A) is 1 nm or more and 200 nm or less.

A third invention is the near-infrared shielding ultrafine particle dispersion body according to the first or second invention, wherein the composite tungsten oxide ultrafine particles (A) include a hexagonal crystal structure.

A fourth invention is the near-infrared shielding ultrafine particle dispersion body according to any one of the first to third inventions, wherein a content of a volatile component contained in the composite tungsten oxide ultrafine particles (A) is 2.5 mass % or less.

A fifth invention is the near-infrared shielding ultrafine particle dispersion body according to any one of the first to fourth inventions, wherein an addition amount of the weather resistance improver (C) is 0.1 to 10 parts by mass with respect to 1 part by mass of the composite tungsten oxide ultrafine particles (A).

A sixth invention is the near-infrared shielding ultrafine particle dispersion body according to any one of the first to fifth inventions, containing the composite tungsten oxide ultrafine particles (A) in an amount of 0.001 mass % to 80 mass %.

A seventh invention is the near-infrared shielding ultrafine particle dispersion body according to any one of the first to sixth inventions, wherein the resin binder (B) is a binder resin of one of resins selected from a resin group consisting of polyethylene terephthalate resin, polycarbonate resin, acrylic resin, styrene resin, polyamide resin, polyethylene resin, vinyl chloride resin, olefin resin, epoxy resin, polyimide resin, fluorine resin, ethylene/vinyl acetate copolymer resin, polyvinyl acetal resin, ionomer resin, and silicone resin, or a mixture of two or more resins selected from the above resin group, or a copolymer of two or more resins selected from the above resin group.

An eighth invention is the near-infrared shielding ultrafine particle dispersion body according to any one of the first to seventh inventions, wherein the near-infrared shielding ultrafine particle dispersion body is in a sheet form, a board form, or a film form.

A ninth invention is the near-infrared shielding ultrafine particle dispersion body according to any one of the first to eighth inventions, wherein the near-infrared shielding ultrafine particle dispersion body is provided as a coating layer having a thickness of 1 μm or more and 10 μm or less on a transparent substrate.

A tenth invention is the near-infrared shielding ultrafine particle dispersion body according to any one of the first to ninth inventions, wherein the transparent substrate is a polyester film, or glass.

An eleventh invention is a near-infrared shielding intermediate film, constituting an interlayer in a near-infrared shielding laminated structure including two or more transparent substrates and the interlayer sandwiched between the two or more transparent substrates,
wherein the near-infrared shielding ultrafine particle dispersion body of any one of claims 1 to 10 is used as the intermediate film.

A twelfth invention is a near-infrared shielding laminated structure, including two or more transparent substrates and an interlayer sandwiched between the two or more transparent substrates,
wherein the interlayer includes one or more intermediate films, and at least one of the intermediate films is a near-infrared shielding intermediate film of the eleventh invention, and
the transparent substrate is any one selected from plate glass, plastic, and plastic containing fine particles having a near-infrared shielding function.

A thirteenth invention is the near-infrared shielding laminated structure according to the twelfth invention, wherein at least one layer of the intermediate film constituting the interlayer is the near-infrared shielding intermediate film of the eleventh invention, and the intermediate film is sandwiched between two intermediate films made of a resin sheet formed using polyvinyl acetal resin or ethylene/vinyl acetate (EVA) copolymer resin.

A fourteenth invention is the near-infrared shielding laminated structure according to the twelfth or thirteenth invention, wherein a thickness of the near-infrared shielding intermediate film is 50 µm or more and 1000 µm or less.

A fifteenth invention is the near-infrared shielding laminated structure according to any one of the twelfth to fourteenth inventions, wherein a haze value is 5% or less when a visible light transmittance is set to 70% or more.

A sixteenth invention is a method for producing a near-infrared shielding ultrafine particle dispersion body in which ultrafine particles having near-infrared shielding properties are dispersed in a solid medium,
wherein ultrafine particles having the near-infrared shielding properties are composite tungsten oxide ultrafine particles (A) represented by a general formula $M_xW_yO_z$ represented by a general formula $W_yO_z$ (where W is tungsten, O is oxygen, satisfying $2.0<z/y<3.0$) and/or composite tungsten oxide ultrafine particles represented by a general formula $M_xW_yO_z$ (where M is one or more elements selected from H, He, alkali metal, alkaline earth metal, rare earth element, Mg, Zr, Cr, Mn, Fe, Ru, Co, Rh, Ir, Ni, Pd, Pt, Cu, Ag, Au, Zn, Cd, Al, Ga, In, Tl, Si, Ge, Sn, Pb, Sb, B, F, P, S, Se, Br, Te, Ti, Nb, V, Mo, Ta, Re, Be, Hf, Os, Bi, and I, W is tungsten, O is oxygen, satisfying $0.001 \leq x/y \leq 1$, $2.0<z/y \leq 3.0$),
the method including: dispersing the composite tungsten oxide ultrafine particles (A) in a solid binder, the composite tungsten oxide ultrafine particles (A) having an XRD peak top intensity ratio value of 0.13 or more based on an XRD peak intensity ratio value of 1 on plane (220) of a silicon powder standard sample, and the solid medium containing a resin binder (B) and a weather resistance improver (C).

A seventeenth invention is the method for producing a near-infrared shielding ultrafine particle dispersion body according to the sixteenth invention, wherein the composite tungsten oxide ultrafine particles (A) have a dispersed particle size of 1 nm or more and 200 nm or less.

An eighteenth invention is the method for producing a near-infrared shielding ultrafine particle dispersion body according to the sixteenth or seventeenth invention, wherein the composite tungsten oxide ultrafine particles (A) include a hexagonal crystal structure.

A nineteenth invention is the method for producing a near-infrared shielding ultrafine particle dispersion body according to any one of the sixteenth to eighteenth invention, wherein a volatile content of the composite tungsten oxide ultrafine particles (A) is 2.5 mass % or less.

Advantage of the Invention

According to the present invention, a near-infrared shielding ultrafine particle dispersion body transparent in a visible light region, having excellent near-infrared shielding properties, having high weather resistance, having a low haze value, excellent in design, with a suppressed blue haze phenomenon, and a near-infrared shielding intermediate film using this near-infrared shielding ultrafine particle dispersion body, and a near-infrared shielding laminated structure using this near-infrared shielding intermediate film, can be obtained.

DETAILED DESCRIPTION OF EMBODIMENT

Figure 1:
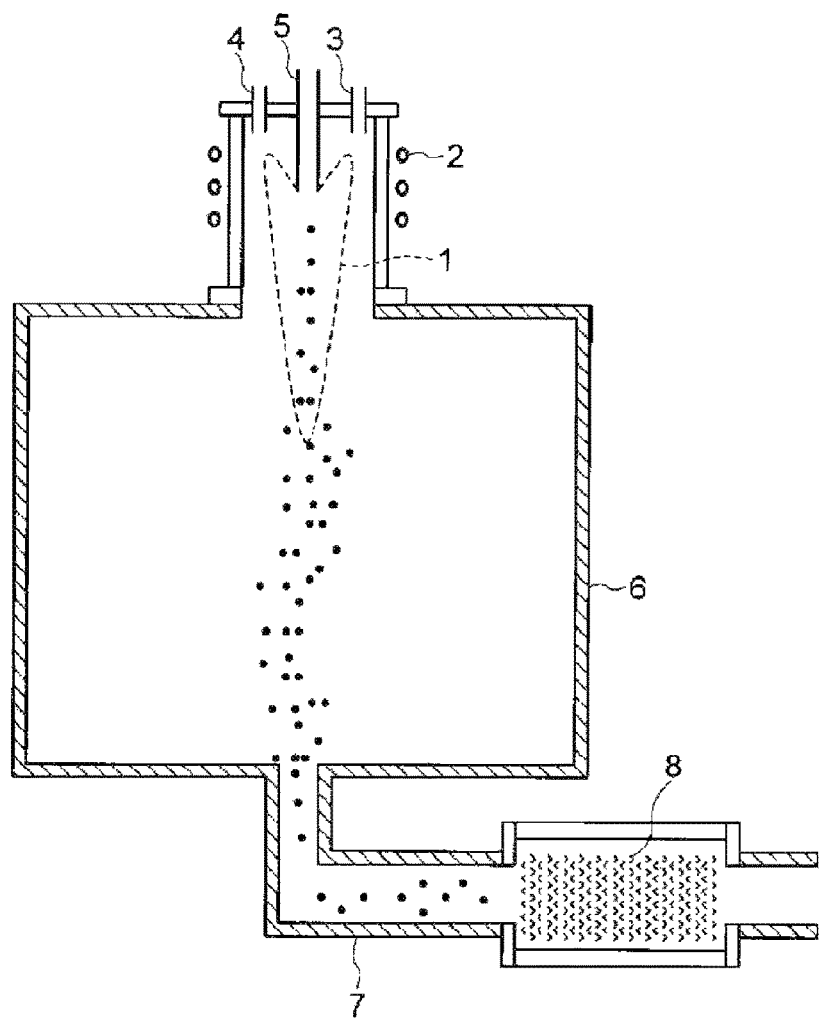
FIG. 1 is a conceptual diagram of a high-frequency plasma reactor used in the present invention.

Embodiments of the present invention will be described hereafter in an order of:
[a] composite tungsten oxide ultrafine particles
(1) composition, (2) crystal structure, (3) XRD peak top intensity, (4) dispersed particle size, (5) BET specific surface area, (6) volatile component,
[b] a method of synthesizing composite tungsten oxide ultrafine particles,
(1) thermal plasma method, (2) solid-phase reaction method, (3) synthesized composite tungsten oxide ultrafine particles,
[c] a volatile component of the composite tungsten oxide ultrafine particles and a drying method thereof,
(1) drying treatment with an air dryer, (2) drying treatment with a vacuum fluidized dryer, (3) drying treatment with a spray dryer,
[d] Composite tungsten oxide ultrafine particle dispersion liquid
(1) solvent, (2) dispersant, (3) weather resistance improver, (4) dispersion method, (5) dispersed particle size, (6) binder, other additives,
[e] Near-infrared shielding ultrafine particle dispersion body
(1) solid medium, (2) production method, (3) additive,
[f] sheet-like, board-like or film-like near-infrared shielding ultrafine particle dispersion body which is an example of the near-infrared shielding ultrafine particle dispersion body, near-infrared shielding intermediate film,
[g] near-infrared shielding ultrafine particle dispersion body used as a coating layer which is an example of a near-infrared shielding ultrafine particle dispersion body, and near-infrared shielding intermediate film,
[h] near infrared shielding laminated structure using near infrared shielding intermediate film.
[a] Composite Tungsten Oxide Ultrafine Particles (Symbol "(A)" May be Added for Convenience in this Specification).

The composite tungsten oxide ultrafine particles (A) used in the present invention will be described in an order of (1) composition, (2) crystal structure, (3) XRD peak top intensity, (4) dispersed particle size, (5) BET specific surface area, (6) volatile component.

(1) Composition

The composite tungsten oxide ultrafine particles (A) according to the present invention are components that exhibit a near-infrared shielding effect, and are the composite tungsten oxide ultrafine particles represented by a general formula MxWyOz (where M is one or more elements selected from H, He, alkali metal, alkaline earth metal, rare earth element, Mg, Zr, Cr, Mn, Fe, Ru, Co, Rh, Ir, Ni, Pd, Pt, Cu, Ag, Au, Zn, Cd, Al, Ga, In, Tl, Si, Ge, Sn, Pb, Sb, B, F, P, S, Se, Br, Te, Ti, Nb, V, Mo, Ta, Re, Be, Hf, Os, Bi, I, and Yb, W is tungsten, O is oxygen, satisfying $0.001 \leq x/y \leq 1$, $2.0 < z/y \leq 3.0$).

The composite tungsten oxide ultrafine particles (A) represented by the general formula MxWyOz will be described.

M element, x, y, z and crystal structures thereof in the general formula MxWyOz have a close relationship with a free electron density of the composite tungsten oxide ultrafine particles, and have a significant effect on near-infrared shielding properties.

Generally, there is no effective free electron in tungsten trioxide ($WO_3$), and therefore near-infrared shielding properties are low. Here, the present inventors found that by adding M element (where M is one or more elements selected from H, He, alkali metal, alkaline earth metal, rare earth element, Mg, Zr, Cr, Mn, Fe, Ru, Co, Rh, Ir, Ni, Pd, Pt, Cu, Ag, Au, Zn, Cd, Al, Ga, In, Tl, Si, Ge, Sn, Pb, Sb, B, F, P, S, Se, Br, Te, Ti, Nb, V, Mo, Ta, Re, Be, Hf, Os, Bi, I, and Yb, W is tungsten, O is oxygen, satisfying $0.001 \leq x/y \leq 1$, $2.0 < z/y \leq 3.0$) into the tungsten oxide to obtain the composite tungsten oxide, free electrons are generated in the composite tungsten oxide, and absorption properties derived from the free electrons appear in a near infrared region, which is effective as a near-infrared shielding material with a wavelength around 1000 nm. It is also found that the composite tungsten oxide remains chemically stable, and is effective as an excellent near-infrared shielding material. Further, it is also found that the M element is more preferably Cs, Rb, K, Tl, Ba, Cu, Al, Mn, or In, and among them, when the M element is Cs or Rb, the composite tungsten oxide easily has a hexagonal crystal structure, and visible light is transmitted and near-infrared light is absorbed and shielded, and therefore Cs or Rb is particularly preferable for reasons described below.

Here, a value of x indicating an addition amount of the M element will be described.

When the value of x/y is 0.001 or more, a sufficient amount of free electrons is generated, and a target near-infrared shielding property can be obtained. Then, as the addition amount of the M element increases, a feed amount of free electrons increases, and the near-infrared shielding property also increases, but when the value of x/y is about 1, the effect is saturated. Further, when the value of x/y is 1 or less, generation of an impurity phase in the composite tungsten oxide ultrafine particles can be avoided, which is preferable. When the composite tungsten oxide ultrafine particles having a hexagonal crystal structure have a uniform crystal structure, the addition amount of the additional M element is preferably 0.2 or more and 0.5 or less, more preferably $0.29 \leq x/y \leq 0.39$, and further preferably around 0.33, in terms of x/y. This is because the value of x/y theoretically calculated from the crystal structure of the hexagonal crystal is 0.33, and favorable optical properties can be obtained with the addition amount around this value.

Next, the value of z indicating control of an oxygen amount will be described.

In the composite tungsten oxide ultrafine particles represented by the general formula MxWyOz, the value of z/y is preferably $2.0 < z/y \leq 3.0$, more preferably $2.2 \leq z/y \leq 3.0$, more preferably, $2.6 \leq z/y \leq 3.0$, and most preferably, $2.7 \leq z/y \leq 3.0$. This is because when the value of z/y is 2.0 or more, the appearance of a crystal phase of $WO_2$, which is a compound other than a target compound, in the composite tungsten oxide can be avoided, and chemical stability as a material can be obtained, and therefore application as an effective near-infrared shielding material is possible.

On the other hand, when the value of z/y is 3.0 or less, a required amount of free electrons is generated in the tungsten oxide, and the material becomes an efficient near-infrared shielding material.

Typical examples include $Cs_{0.33}WO_3$, $Rb_{0.33}WO_3$, $K_{0.33}WO_3$, $Ba_{0.33}WO_3$ and the like. However, when the values of x, y, and z fall within the above ranges, useful near-infrared absorption properties can be obtained.

(2) Crystal Structure

Composite tungsten oxide ultrafine particles have a structure of tetragonal and cubic tungsten bronze in addition to hexagonal, and any structure of them is effective as a near-infrared shielding material. However, a light absorption position in the near-infrared region is likely to change depending on the crystal structure taken by the composite tungsten oxide ultrafine particle, and the light absorption position in the near-infrared region is shifted to a longer wavelength side in a case of the tetragonal crystal structure than the cubic crystal structure, and the light absorption position is likely to be shifted to a longer wavelength side further in a case of the hexagonal crystal structure than the tetragonal crystal structure. Further, in conjunction with a fluctuation of the absorption position, absorption in the visible light region is smallest in an order of the hexagonal crystal structure, the tetragonal crystal structure, and the cubic crystal structure in which absorption is largest among them.

From the above finding, for applications in which light in the visible light region is more transmitted and light in the near-infrared region is more absorbed, it is most preferable to use the hexagonal tungsten bronze. When the composite tungsten oxide ultrafine particles have a hexagonal crystal structure, the transmittance of the fine particles in the visible light region is improved, and the absorption in the near infrared region is improved. Further, when the composite tungsten oxide ultrafine particles have a monoclinic crystal structure similar to $WO_{2.72}$ called a Magneli phase or an orthorhombic crystal structure, the composite tungsten oxide ultrafine particles have excellent near-infrared absorption and are sometimes effective as a near-infrared shielding material.

As described in the section "(1) composition", when the composite tungsten oxide ultrafine particles having a hexagonal crystal structure have a uniform crystal structure, the addition amount of the additional M element is preferably 0.2 or more and 0.5 or less, more preferably, $0.29 \leq x/y \leq 0.39$ in terms of x/y. Theoretically, it is considered that when z/y=3, the value of x/y becomes 0.33, so that the added M element is arranged in all hexagonal voids.

Further, in the composite tungsten oxide ultrafine particles, it is desirable that 50% or more of the volume of each ultrafine particle is a single crystal. In other words, each ultrafine particle is preferably made of a single crystal in which a volume ratio of the amorphous phase is less than 50%.

As described below, the dispersed particle size of the composite tungsten oxide ultrafine particles is preferably 200 nm or less, from a viewpoint of ensuring the transparency of a dispersion liquid or a dispersion body in which the composite tungsten oxide ultrafine particles are dispersed. On the other hand, as described above, in order to exhibit excellent optical properties, the composite tungsten oxide ultrafine particles preferably have high crystallinity.

Accordingly, since the dispersed particle size of the composite tungsten oxide ultrafine particles is 1 nm or more and 200 nm or less, a crystallite size is preferably 200 nm or less.

Then, as described above, when at least 50% of each ultrafine particle volume is a single crystal, the composite tungsten oxide ultrafine particles have excellent near-infrared shielding properties, and have the XRD peak top intensity ratio value of 0.13 or more based on the XRD peak intensity ratio value of 1 on plane (220) of a silicon powder standard sample.

At this time, it is more preferable that the composite tungsten oxide ultrafine particles have a crystallite size of 200 nm or less and 10 nm or more. This is because when the crystallite size is in a range of 200 nm or less and 10 nm or more, the XRD peak top intensity ratio value exceeds 0.13, and further excellent near-infrared shielding properties are exhibited.

In contrast, although the dispersed particle size is 1 nm or more and 200 nm or less in the composite tungsten ultrafine particles, when the amorphous phase exists in a volume ratio of 50% or more, or when the composite tungsten oxide ultrafine particles are polycrystalline in each ultrafine particle, the XRD peak top intensity ratio value of the composite tungsten oxide ultrafine particles is less than 0.13, and as a result, the near-infrared absorption properties may be insufficient and the near-infrared shielding properties may not be sufficiently developed.

Note that the XRD pattern of the composite tungsten oxide ultrafine particles contained in the composite tungsten oxide ultrafine particle dispersion liquid after being disintegrated, pulverized or dispersed described later, is also maintained in the XRD pattern of the composite tungsten oxide ultrafine particles contained in the near-infrared shielding ultrafine particle dispersion body and the near-infrared shielding laminated structure.

Accordingly, when the values indicated by the XRD pattern, the XRD peak top intensity, the crystallite size, and the like of the composite tungsten oxide ultrafine particles contained in the near-infrared shielding ultrafine particle dispersion liquid and dispersion body satisfy the above-described range of the present invention and the composite tungsten oxide ultrafine particles used in the present invention have a predetermined crystallinity, excellent near-infrared shielding properties according to the present invention are exhibited.

(3) XRD Peak Top Intensity

XRD peak top intensity of the composite tungsten oxide ultrafine particles according to the present invention will be more specifically described.

As described above, the composite tungsten oxide ultrafine particles according to the present invention have excellent near-infrared shielding properties, and have the XRD peak top intensity ratio value of 0.13 or more based on an XRD peak intensity ratio value of 1 on plane (220) of the silicon powder standard sample.

According to the finding by the present inventors, the XRD peak top intensity of the composite tungsten oxide ultrafine particles described above is closely related to the crystallinity of the fine particles, and a as a result, it is closely related to a free electron density of the fine particles, and greatly affects the near-infrared absorption property of the fine particles.

Specifically, when the XRD peak top intensity ratio value is 0.13 or more, the free electron density in the ultrafine particles is secured, and desired near-infrared shielding properties can be obtained. Specifically, the XRD peak top intensity ratio value may be 0.13 or more, and is preferably 0.7 or less.

Note that, top intensity of the XRD peak refers to diffraction intensity at a diffraction peak where the diffraction intensity is highest, in a powder X-ray diffraction pattern of the above-described composite tungsten oxide ultrafine particles and standard sample (Horizontal axis: diffraction angle (2θ) vs. Vertical axis: diffraction intensity). In the case of the composite tungsten oxide according to the present invention, for example, in hexagonal Cs composite tungsten oxide and Rb composite tungsten oxide, a maximum peak of the diffraction intensity in the X-ray diffraction pattern appears in a range of 2θ=25° to 31°.

A powder X-ray diffraction method is used to measure the XRD peak top intensity of the composite tungsten oxide ultrafine particles described above. At this time, in order to provide objective quantification of the measurement results between the samples of the composite tungsten oxide ultrafine particles, a standard sample is determined and the peak intensity of the standard sample is measured, and the XRD peak top intensity ratio value of the ultrafine particle sample with respect to the peak intensity of the standard sample was used to represent the XRD peak top intensity of each ultrafine particle sample.

Here, a silicon powder standard sample (manufactured by NIST, 640c) which is universal in the industry is used as the standard sample, and the (220) plane in the silicon powder standard sample, which does not overlap with the XRD peak of the composite tungsten oxide ultrafine particles, was used as a reference.

In order to have objective quantification in comparison between samples, it is necessary that standard samples are measured under the same conditions.

First, a sample holder with a depth of 1.0 mm is filled with the fine particle sample by a known operation in X-ray diffraction measurement. Specifically, in order to avoid a preferential orientation (crystal orientation) in the fine particle sample, it is preferable to fill the sample holder randomly and gradually, and fill the sample holder as densely as possible without unevenness.

As an X-ray source, an X-ray tube having Cu as an anode target material is used in an output setting of 45 kV/40 mA, and measurement is performed by powder X-ray diffraction method of θ-2θ in a step scan mode (step size: 0.0165° (2θ) and counting time: 0.022 msec/step).

At this time, the XRD peak intensity is varied according to the use time of the X-ray tube, and therefore it is preferable that the use time of the X-ray tube is almost the same among samples. In order to ensure objective quantification, it is necessary that a difference between the samples during the use time of the X-ray tube be at most 1/20 or less of a predicted lifetime of the X-ray tube.

As described above, in order to ensure the quantification of the XRD peak top intensity of each ultrafine particle sample, the present invention employs a method of performing the above-described measurement of the silicon powder standard sample for each measurement of the X-ray diffraction pattern of the composite tungsten oxide ultrafine particles, and calculating the XRD peak top intensity ratio.

On the other hand, the X-ray tube predicted lifetime of a commercially available X-ray device is mostly several thousand hours or more and the measurement time per sample is several hours or less, and therefore by performing the above-described preferable measurement method, an influence on the XRD peak top intensity ratio due to the use time of the X-ray tube can be made negligibly small.

Further, in order to keep the temperature of the X-ray tube constant, a cooling water temperature for the X-ray tube is preferably kept constant.

The XRD peak top intensity of the composite tungsten oxide ultrafine particles according to the present invention will be described from a different viewpoint.

The XRD peak top intensity ratio value of the composite tungsten oxide ultrafine particles according to the present invention is 0.13 or more, and this shows that composite tungsten oxide ultrafine particles with good crystallinity and containing almost no heterogenous phase are obtained, and further shows that in the composite tungsten oxide ultrafine particles, the XRD peak is not broadened and an amorphous state is not advanced.

Further, by analyzing the XRD pattern obtained when measuring the XRD peak top intensity, simultaneously, it is confirmed that there is no compound phase other than the composite tungsten oxide which is preferred in the present invention.

As a result, it is confirmed that the composite tungsten oxide ultrafine particles have good crystallinity and do not have an amorphous phase, and no unpreferable compound phase is present in the present invention. As a result, it is considered that by dispersing the composite tungsten oxide ultrafine particles in the solid medium such as a resin that transmits visible light, a near-infrared shielding ultrafine particle dispersion body having excellent near-infrared shielding properties can be obtained. Note that in the present invention, a compound phase other than the composite tungsten oxide according to the present invention may be described as "heterogenous phase".

(4) Dispersed Particle Size

The dispersed particle size of the composite tungsten oxide ultrafine particles according to the present invention, is preferably from 1 nm to 200 nm, and more preferably, the dispersed particle size is from 10 nm to 200 nm. The dispersed particle size of the composite tungsten oxide ultrafine particles is preferably 200 nm or less, and this also applies to the composite tungsten oxide ultrafine particles in the composite tungsten oxide ultrafine particle dispersion liquid.

It is important that the dispersed particle size of the composite tungsten oxide ultrafine particles is 1 nm or more and 200 nm or less in order to reduce light scattering by the particles. The reason is as follows: when the dispersed particle size of the particles dispersed in the dispersion liquid is small, it is possible to reduce light scattering in the visible light region with a wavelength of 400 nm to 780 nm, the light scattering being geometric scattering or Mie scattering.

As a result of the scattering of the light being reduced, it is possible to prevent the fine particle dispersion body from becoming like frosted glass and losing clear transparency. Namely, when the dispersed particle size of dispersed particles is 200 nm or less, the above-described geometrical scattering or Mie scattering is reduced, and a region where the Rayleigh scattering is strong can be provided. In the Rayleigh scattering region, the scattered light is proportional to the sixth power of the particle size, and therefore as the average dispersed particle size of the fine particles decreases, the scattering decreases and the transparency improves. Further, when the dispersed particle size is 100 nm or less, the scattered light is extremely reduced, which is particularly preferable. On the other hand, from a viewpoint of avoiding light scattering, it is preferable that the dispersed particle size be 1 nm or more, more preferably 10 nm or more. Note that industrial production is not difficult if the dispersed particle size is 1 nm or more.

(5) BET Specific Surface Area

The BET specific surface area of the composite tungsten oxide ultrafine particles according to the present invention is closely related to a particle size distribution of the ultrafine particles. Then, the value of the BET specific surface area affects a production cost and productivity of the near-infrared shielding ultrafine particle dispersion liquid using the composite tungsten oxide ultrafine particles as a raw material, the near-infrared shielding properties of the ultrafine particles themselves and a light resistance that suppresses light coloring.

The small BET specific surface area of the composite tungsten oxide ultrafine particles indicates that the particle size of the ultrafine particles is large. Accordingly, when the BET specific surface area of the fine particles is less than $30.0 \text{ m}^2/\text{g}$, the composite tungsten oxide ultrafine particles are transparent in the visible light region, and in addition, it is not necessary to pulverize the ultrafine particles for a long time with a medium stirring mill to further refine the particles in order to produce the near-infrared shielding ultrafine particle dispersion liquid capable of suppressing the above-described blue haze phenomenon, and the production cost of the near-infrared shielding ultrafine particle dispersion liquid according to the present invention can be reduced and the productivity can be improved.

The BET specific surface area of the ultrafine particles is equal to or less than a predetermined value, for example, 200 $\text{m}^2/\text{g}$ or less. This shows that the BET particle size becomes 2 nm or more when the particle shape is assumed to be true spherical, and shows that almost no ultrafine particles exist having a crystallite size of 1 nm or less not contributing to near-infrared absorption properties. Therefore, when the BET specific surface area of the composite tungsten oxide ultrafine particles is 200 $\text{m}^2/\text{g}$ or less, the near-infrared absorption properties and the light resistance of the ultrafine particles are ensured.

To measure the BET specific surface area of the composite tungsten oxide ultrafine particles described above, nitrogen gas, argon gas, krypton gas, xenon gas or the like is used as the gas used for the adsorption. However, when a measurement sample is powder, with the specific surface area being 0.1 $\text{m}^2/\text{g}$ or more like the composite tungsten oxide ultrafine particles according to the present invention, it is desirable to use low-cost nitrogen gas which is relatively easy to handle.

The BET specific surface area of the composite tungsten oxide ultrafine particles is preferably 30.0 $\text{m}^2/\text{g}$ or more and 200.0 $\text{m}^2/\text{g}$ or less, more preferably, 30.0 $\text{m}^2/\text{g}$ or more and 120.0 $\text{m}^2/\text{g}$ or less, further preferably 30.0 $\text{m}^2/\text{g}$ or more and 90.0 $\text{m}^2/\text{g}$ or less, and most preferably 35.0 $\text{m}^2/\text{g}$ or more and 70.0 $\text{m}^2/\text{g}$ or less.

The BET specific surface area of the composite tungsten oxide ultrafine particles is preferably the above-described value before and after pulverization and dispersion when obtaining the composite tungsten oxide ultrafine particle dispersion liquid.

This is because when the BET specific surface area of the composite tungsten oxide ultrafine particles according to the present invention is 200 m²/g or less, and in addition, when the XRD peak top intensity ratio value is equal to or more than a predetermined value, there are almost no ultrafine particles with a crystallite size of 1 nm or less not contributing to the near-infrared shielding properties, and it is considered that the near-infrared shielding properties and the light resistance are ensured because ultrafine particles with good crystallinity exist.

(6) Volatile Component

The composite tungsten oxide ultrafine particles according to the present invention may contain a component that volatilizes by heating (which may be described as "volatile component" in the present invention). The volatile component is derived from a substance adsorbed when the composite tungsten oxide particles are exposed to storage atmosphere or air, or during a synthesis treatment. Here, specific examples of the volatile component include water and a dispersion liquid described later, and for example, it is a component that volatilizes from the composite tungsten oxide ultrafine particles by heating at 150° C. or less.

The volatile component and the content thereof in the composite tungsten oxide ultrafine particles may affect the dispersibility when the ultrafine particles are dispersed in a resin (medium resin) or the like. For example, when the compatibility between the resin used in the near-infrared absorbing dispersion body described later and the volatile component adsorbed on the ultrafine particles is poor, and when the volatile component content in the ultrafine particles is large, it may cause haze (decrease in transparency) of the produced near-infrared absorbing dispersion body. Further, when the produced near-infrared absorbing dispersion body is installed outdoors for a long time and is exposed to sunlight or wind and rain, the composite tungsten oxide ultrafine particles may desorb to the outside of the near-infrared absorbing dispersion body, or the layer may peel off from the near-infrared shielding ultrafine particle dispersion body.

This is because the deterioration of the compatibility between the ultrafine particles and the resin causes the deterioration of the near-infrared shielding ultrafine particle dispersion body. Accordingly, when the content of the volatile component in the composite tungsten oxide ultrafine particles according to the present invention is not more than a predetermined amount, haze (transparency deterioration) and property deterioration during outdoor use are suppressed, and wide versatility is exhibited.

According to the study by the present inventors, in the case of the volatile component content of 2.5 mass % or less in the composite tungsten oxide ultrafine particles, the ultrafine particles are dispersible in most dispersion medium, and versatile composite tungsten oxide ultrafine particle dispersion liquid can be obtained. As a result, the composite tungsten oxide ultrafine particles can be dispersed in a desired medium resin or the like by uniformly mixing and kneading (including melt mixing) using mixers such as tumblers, Nauter mixers, Henschel mixers, super mixers, and planetary mixers, and kneading machines such as Banbury mixers, kneaders, rolls, single-screw extruders, and twin-screw extruders, if there is no problem such as excessive secondary aggregation.

The content of the volatile component in the composite tungsten oxide ultrafine particles can be measured by thermal analysis. Specifically, a weight reduction of a composite tungsten oxide ultrafine particle sample may be measured by holding the composite tungsten oxide fine particle sample at a temperature lower than a temperature at which the composite tungsten oxide fine particle is thermally decomposed and higher than a temperature at which the volatile component is volatilized. Further, when the volatile component is specified, gas mass spectrometry may be used together to analyze the volatile component.

[b] Method for Synthesizing Composite Tungsten Oxide Ultrafine Particles

A method for synthesizing composite tungsten oxide ultrafine particles according to the present invention will be described.

The method for synthesizing the composite tungsten oxide ultrafine particles, includes a thermal plasma method for charging a tungsten compound starting material into a thermal plasma, and a solid-phase reaction method for performing heat treatment to the tungsten compound starting material in a reducing gas atmosphere.

Explanation will be given hereafter in an order of (1) Thermal plasma method, (2) Solid-phase reaction method, and (3) Synthesized composite tungsten oxide ultrafine particles.

(1) Thermal Plasma Method

Explanation will be given for the thermal plasma method in an order of (i) Raw material used for the thermal plasma method, (ii) Thermal plasma method and its conditions.

(i) Raw Material Used for the Thermal Plasma Method

When synthesizing the composite tungsten oxide ultrafine particles represented by the general formula MxWyOz (where M is the M element, W is tungsten, O is oxygen, satisfying $0.001 \leq x/y \leq 1$, $2.0 < z/y \leq 3.0$) according to the present invention by the thermal plasma method, a mixed powder of the tungsten compound and the M element compound can be used as a raw material.

The tungsten compound is preferably at least one selected from tungstic acid ($H_2WO_4$), ammonium tungstate, tungsten hexachloride, and tungsten hydrate obtained by adding water to the tungsten hexachloride which is dissolved in alcohol and hydrolyzed and then evaporating the solvent.

Further, as the M element compound, it is preferable to use at least one element selected from oxides, hydroxides, nitrates, sulfates, chlorides and carbonates of M element.

The above-described tungsten compound and the above-described aqueous solution containing M element compound, are wet-mixed so that the ratio of the M element to the W element is $M_xW_yO_z$. Then, by drying the obtained mixture liquid, a mixed powder of the M element compound and the tungsten compound is obtained. Then, the mixed powder can be used as a raw material for the thermal plasma method.

Further, the composite tungsten oxide obtained by first firing of the mixed powder in an inert gas alone or in a mixed gas atmosphere of the inert gas and a reducing gas, can also be used as a raw material for the thermal plasma method. Besides, the composite tungsten oxide obtained by two stage firing such as first firing of the mixed powder in the mixed gas atmosphere of the inert gas and the reducing gas, and a second firing of the first fired material in the inert gas atmosphere, can also be used as the raw material for the thermal plasma method.

(ii) Thermal Plasma Method and its Conditions

As the thermal plasma used in the present invention, for example, any one of DC arc plasma, high-frequency plasma, microwave plasma, low frequency alternating current plasma, or superimposed plasma of them, or plasma generated by an electric method of applying a magnetic field to direct current plasma, plasma generated by irradiation of a large output laser, and plasma generated by high power electron beam or ion beam, can be used. However, regardless of which thermal plasma is used, it is preferable to use thermal plasma having a high temperature part of 10000 to 15000 K, and particularly to use plasma capable of controlling the time for generating the fine particles.

The raw material fed into the thermal plasma having the high temperature part is evaporated instantaneously in the high temperature part. Then, the evaporated raw material is condensed in the course of reaching a plasma tail flame part, and is rapidly solidified outside of the plasma flame, thereby producing the composite tungsten oxide ultrafine particles.

A synthesis method will be described with reference to FIG. 1 taking as an example a case of using a high-frequency plasma reaction device.

First, an inside of a reaction system constituted by an inside of a water-cooled quartz double tube and an inside of a reaction vessel 6 is evacuated to about 0.1 Pa by a vacuum exhaust device. After evacuating the inside of the reaction system, this time the inside of the reaction system is filled with argon gas to make an argon gas flow system of 1 atm. Thereafter, any gas selected from argon gas, mixed gas of argon and helium (Ar—He mixed gas), mixed gas of argon and nitrogen (Ar—$N_2$ mixed gas) is introduced into the reaction vessel as a plasma gas at a flow rate of 30 to 45 L/min. On the other hand, Ar—He mixed gas is introduced at a flow rate of 60 to 70 L/min, as the sheath gas to be flowed to immediately outside of the plasma region. Then, an alternating current is applied to the high-frequency coil 2 to generate thermal plasma by a high-frequency electromagnetic field (frequency 4 MHz). At this time, high-frequency power is set to 30 to 40 kW.

Reaction is carried out for a predetermined time by introducing mixed powder of M element compound and tungsten compound obtained by the above synthesis method, or a raw material of the composite tungsten oxide, from a raw material powder feed nozzle 5 into thermal plasma, for example, at a feed rate of 25 to 50 g/min, using argon gas supplied from a gas feed device as carrier gas. After the reaction, the produced calcium lanthanum boride fine particles are deposited on a filter 28, and are collected.

In the thermal plasma method described above, the carrier gas flow rate and the raw material feed rate greatly affect the generation time of the ultrafine particles. Therefore, it is important to appropriately adjust the flow rate of the carrier gas and the feed rate of the raw material so as to obtain a desired crystallinity of the composite tungsten oxide ultrafine particles.

Further, the plasma gas has a function of maintaining a thermal plasma region having a high temperature portion of 10000 to 15000 K, and sheath gas has a function of cooling an inner wall surface of a quartz torch in the reaction vessel, and preventing the quartz torch from melting.

Since the sheath gas flow rate affects the shape of a plasma region together with the plasma gas flow rate, the flow rates of these gases are important parameters for controlling the shape of the plasma region.

For example, as the plasma gas flow rate and the sheath gas flow rate are increased, the shape of the plasma region extends in a gas flow direction, and a temperature gradient of the plasma tail flame part becomes gentle, and as a result, it becomes possible to lengthen the generation time of the ultrafine particles to be produced and to produce the ultrafine particles with high crystallinity.

On the contrary, as the plasma gas flow rate and the sheath gas flow rate are decreased, the shape of the plasma region shrinks in a gas flow direction, and the temperature gradient of the plasma tail flame part becomes steep, and as a result, it becomes possible to shorten the generation time of the ultrafine particles to be produced and to form the ultrafine particles having a large BET specific surface area.

The composite tungsten oxide ultrafine particles having a predetermined XRD peak top intensity according to the present invention can be produced, by controlling the gas feed conditions of the plasma gas and the sheath gas described above and the raw material feed conditions, thereby controlling the generation time of the ultrafine particles, and controlling the crystallinity of the obtained ultrafine particles.

However, optimal conditions for generating ultrafine particles using a plasma reactor are different, specifically depending on a structure of a plasma generating area, a plasma frame shape formed inductively by feeding plasma gas, and the shape of a feeding pipe for feeding a processing substance together with an active gas or an inert gas into the plasma frame, and further a channel shape of a dispersion nozzle attached to the tip of the feeding pipe for carrying a treatment substance, and the like. As a result, according to the plasma generation area of each device, the gas feed conditions of the plasma gas and sheath gas, the carrier gas feed conditions, and the raw material feed conditions are controlled, to thereby control the generation time of the ultrafine particles and control the crystallinity of the obtained ultrafine particles.

When using a high frequency plasma reactor shown in FIG. 1 (high frequency plasma generator manufactured by Sumitomo Metal Mining Co., Ltd.; water-cooled double quartz heavy pipe having 70 mm length inner diameter and 213 mm length manufactured by Japan High Frequency Co., Ltd), as described above, the inside of a reaction system was evacuated to about 0.1 Pa with a vacuum exhaust device, and thereafter an atmosphere was completely replaced with argon gas to form a 1-atmosphere flow system. Thereafter, argon gas was introduced as plasma gas at a flow rate of 30 L/min from a plasma gas feed nozzle 4 into a reaction vessel, and 55 L/min of argon gas and 5 L/min of helium gas were spirally introduced as sheath gas from a sheath gas feed nozzle 3. Then, a high-frequency power of 40 kW was applied to a water-cooled copper coil for high-frequency plasma generation to generate high-frequency plasma. With these conditions as standard conditions, the plasma gas and sheath gas feed conditions, carrier gas feed conditions, and raw material feed conditions were changed and an evaluation of the properties of the generated ultrafine particles was repeated, to find conditions for producing ultrafine particles having desired properties.

The XRD peak top intensity and BET specific surface area of the composite tungsten oxide ultrafine particles described above can be controlled, by selecting predetermined production conditions in the above-described production method, and can be controlled by appropriately setting production conditions such as temperature (firing temperature) at which the composite tungsten oxide ultrafine particles are generated by a thermal plasma method, a solid-phase reaction method, etc., generation time (firing time), generation atmosphere (firing atmosphere), the form of a precursor raw material, post-generation annealing treatment, and impurity element doping.

Specifically, the effect of the present invention is exhibited by setting a difference to 20% or less, between the average particle size and the crystallite size of the composite tungsten oxide ultrafine particles in the near-infrared shielding fine particle dispersion body.

(2) Solid-Phase Reaction Method

The solid-phase reaction method will be described in an order of (i) Raw material used in the solid-phase reaction method, and (ii) Firing in the solid-phase reaction method and its conditions.

(i) Raw Material Used in the Solid-Phase Reaction Method

When synthesizing the composite tungsten oxide ultrafine particles by the solid-phase reaction method, a tungsten compound and an M element compound are used as the raw material.

The tungsten compound is preferably at least one selected from tungstic acid ($H_2WO_4$), ammonium tungstate, tungsten hexachloride, and tungsten hydrate obtained by adding water to the tungsten hexachloride which is dissolved in alcohol and hydrolyzed, and then evaporating the solvent. Further, tungsten trioxide may be used instead of the tungsten compound.

Further, the M element compound is preferably at least one selected from oxides, hydroxides, nitrates, sulfates, chlorides, and carbonates of the M element.

Further, when synthesizing the composite tungsten oxide ultrafine particles according to the present invention by a solid phase reaction method, a compound containing an impurity element of at least one selected from Si, Al, and Zr (sometimes referred to as "impurity element compound" in the present invention) may be contained as a raw material.

The impurity element compound does not react with the composite tungsten compound in a subsequent firing step, and works to suppress a crystal growth of the composite tungsten oxide and prevent coarsening of the crystal. The compound containing the impurity element is preferably at least one selected from oxides, hydroxides, nitrates, sulfates, chlorides, carbonates, and colloidal silica and colloidal alumina having a particle size of 500 nm or less are particularly preferable.

The above-described tungsten compound, the aqueous solution containing the M element compound, and the impurity element compound are wet-mixed in such a manner that the ratio of the M element to the W element is the ratio of the M element to the W element in $M_xW_yO_z$ as described above. When the impurity element compound is contained as a raw material, the impurity element compound is wet-mixed so as to be 0.5 mass % or less. Then, by drying the obtained mixed solution, the mixed powder of the M element compound and the tungsten compound, or the mixed powder of the M element compound containing the impurity element compound and the tungsten compound can be obtained.

(ii) Firing in the Solid-Phase Reaction Method and its Conditions

One-stage firing is performed to the mixed powder of the M element compound and the tungsten compound produced by the wet-mixing, or the mixed powder of the M element compound containing the impurity element compound and the tungsten compound, in the inert gas alone or mixed gas atmosphere of the inert gas and reducing gas. In this event, a firing temperature is preferably close to a temperature at which the composite tungsten oxide ultrafine particles start to crystallize. Specifically, the firing temperature is preferably 1000° C. or less, more preferably 800° C. or less, still more preferably 800° C. or less and 500° C. or more.

By controlling the firing temperature, the crystallinity of the obtained ultrafine particles is controlled, and the XRD peak top intensity of the composite tungsten oxide ultrafine particles of the present invention can be set in a predetermined range.

(3) Synthetic Composite Tungsten Oxide Ultrafine Particles

There are cases such that the particle size of the composite tungsten oxide ultrafine particles obtained by the above-described thermal plasma method or solid-phase reaction method exceeds 200 nm; and the dispersed particle size of the composite tungsten oxide ultrafine particles contained in a dispersion liquid exceeds 200 nm when producing the composite tungsten oxide ultrafine particle dispersion liquid described below.

In these cases, the degree of the pulverization/dispersion treatment may be controlled in the step of producing the composite tungsten oxide ultrafine particle dispersion liquid described below so that the dispersed particle size is 200 nm or less. In this event, if the XRD peak intensity ratio value of the composite tungsten oxide ultrafine particles obtained through the pulverization/dispersion treatment can be in the range of the present invention, the composite tungsten oxide ultrafine particles according to the present invention and the composite tungsten oxide ultrafine particle dispersion body obtained from the dispersion liquid thereof can exhibit excellent near-infrared shielding properties.

[c] a Volatile Component of the Composite Tungsten Oxide Ultrafine Particles and a Drying Method Thereof As described above, the composite tungsten oxide ultrafine particles of the present invention contain the volatile component in some cases, but in this case, the content of the volatile component is preferably 2.5 mass % or less. However, when the composite tungsten oxide ultrafine particles are exposed to the atmosphere or the like and the content of the volatile component exceeds 2.5 mass %, the content of the volatile component can be reduced by a drying treatment.

Specifically, the composite tungsten oxide ultrafine particles of the present invention can be produced through a step of pulverizing and dispersing the composite tungsten oxide synthesized by the method described above to form fine particles, and dispersing the composite tungsten oxide ultrafine particles in a solvent (pulverizing and dispersing step), and a step of drying the composite tungsten oxide ultrafine particle dispersion liquid thus produced, and removing the solvent (drying step).

As facilities for drying treatment, an air dryer, a universal mixer, a ribbon mixer, a vacuum flow drier, an oscillating fluid drier, a freeze dryer, a ribbon corn, a rotary kiln, a spray dryer, a pulverized dryer, and the like are preferable from a viewpoint that heating and/or decompression is possible and mixing and recovery of the fine particles is easy, but the present invention is not limited thereto.

As an example thereof, (1) A drying treatment by the air dryer, (2) A drying treatment by the vacuum flow drier, and (3) A drying treatment by a spray dryer will be described hereafter.

(1) Drying Treatment by an Air Dryer

This is a treatment method for applying drying treatment to the composite tungsten oxide fine particle dispersion liquid obtained by a method described later in which the composite tungsten oxide ultrafine particles are dispersed in the solvent, to remove the volatile component in the dispersion liquid by an air dryer. In this case, it is preferable to perform the drying treatment at a temperature higher than the temperature at which the volatile component volatilizes from the composite tungsten oxide ultrafine particles and the temperature at which the element M is not desorbed, and 150° C. or less is preferable.

The composite tungsten oxide ultrafine particles produced by the drying treatment using the air dryer are weak secondary aggregates. Even in this state, it is possible to disperse the composite tungsten oxide ultrafine particles in a resin or the like, but in order to make it easier to disperse, it is also a preferable example to disintegrate the fine particles by a mash-crushing machine or the like.

(2) Drying Treatment by a Vacuum Flow Dryer

When removing volatile components from the dispersion liquid in which the composite tungsten oxide ultrafine particles are dispersed in the solvent, the drying treatment is preferably performed by the vacuum flow drier. This is because in the vacuum flow drier, drying and disintegration treatments are performed at the same time under a reduced pressure atmosphere, and therefore in addition to having a high drying rate, aggregates as seen in the above-described dried product in the air dryer are not formed. Further, because of drying in the reduced pressure atmosphere, the volatile component can be removed even at a relatively low temperature, and an amount of a residual volatile component can be minimized as well. The drying temperature is preferably set so as to be dried at a temperature at which the element M is not desorbed from the composite tungsten oxide ultrafine particles, and it is a temperature higher than a temperature at which the volatile component is volatilized, and 150° C. or less is preferable.

(3) Drying Treatment by a Spray Dryer

When performing the drying treatment by a spray dryer to remove the volatile component from the dispersion liquid in which the composite tungsten oxide ultrafine particles are dispersed in the solvent, the spray dryer has a characteristic such that secondary aggregation hardly occurs due to a surface force of the volatile component when removing the volatile component in the drying treatment. Accordingly, it is preferable because the composite tungsten oxide ultrafine particles which are not secondary aggregated can be easily obtained without performing a crushing treatment.

By dispersing the composite tungsten oxide ultrafine particles subjected to the drying treatment according to the above (1) to (3) in the resin or the like by an appropriate method, it is possible to form a near-infrared shielding material ultrafine particle dispersion body having high visible light transmittance and excellent near-infrared ray shielding properties, and low haze value.

As described above, the XRD peak top intensity and the BET specific surface area of the composite tungsten oxide ultrafine particles can be controlled by selecting predetermined production conditions in the above-described production method, and can be controlled by appropriately setting production conditions, specifically, such as temperature (firing temperature) at which the composite tungsten oxide ultrafine particles are generated by the thermal plasma method, the solid-phase reaction method, etc., generation time (firing time), generation atmosphere (firing atmosphere), the form of a precursor raw material, post-generation annealing treatment, and impurity element doping.

On the other hand, the content of the volatile component in the composite tungsten oxide ultrafine particles can be controlled by a suitable setting of the production conditions such as a preservation method and a storage atmosphere of the fine particles, a temperature at which the ultrafine particles dispersion liquid is dried, a drying time, and a drying method, and the like. Note that the content of the volatile component of the composite tungsten oxide ultrafine particles does not depend on the crystal structure of the composite tungsten oxide ultrafine particles or the synthesis method of the composite tungsten oxide ultrafine particles such as the thermal plasma method or the solid-phase reaction method described later.

[d] Composite Tungsten Oxide Ultrafine Particle Dispersion Liquid

Next, the composite tungsten oxide ultrafine particle dispersion liquid used for producing the near-infrared shielding ultrafine particle dispersion body according to the present invention will be described.

The composite tungsten oxide ultrafine particle dispersion liquid according to the present invention is obtained by mixing the composite tungsten oxide ultrafine particles obtained by the above synthesis method, the solvent selected from water, an organic solvent, oil and fat, a liquid plasticizer for a medium resin, a polymer monomer, or a mixture thereof, an appropriate amount of a dispersant, and further a weather resistance improver (C), to obtain a mixture, and pulverizing and dispersing the mixture, using a medium stirring mill, etc.

In addition to the above-described raw materials, a coupling agent, a surfactant, and the like can be added to the above-described composite tungsten oxide ultrafine particle dispersion liquid. The above composite tungsten oxide ultrafine particle dispersion liquid is characterized in that a dispersion state of the ultrafine particles in the solvent is good, and the dispersed particle size is 1 nm or more and 200 nm or less.

Further, it is preferable that the content of the composite tungsten oxide ultrafine particles contained in the composite tungsten oxide ultrafine particle dispersion liquid is 0.01 mass % or more and 80 mass % or less.

The composite tungsten oxide ultrafine particle dispersion liquid according to the present invention will be described hereafter in an order of (1) Solvent, (2) Dispersant, (3) Weather resistance improver, (4) Dispersion method, (5) Dispersed particle size, (6) Binder, and other additives.

(1) Solvent

The solvent used in the composite tungsten oxide ultrafine particle dispersion liquid used in the present invention is not particularly limited, and may be appropriately selected according to a coating condition and a coating environment of the composite tungsten oxide ultrafine particle dispersion liquid, and appropriately added inorganic binder and resin binder. Further, a resin composition is prepared by obtaining the dispersion liquid in which the near-infrared shielding ultrafine particles are dispersed in a plasticizer as a solvent, and adding this dispersion liquid to a resin binder (B).

Even when the resin composition is formed into a sheet, a board, or a film shape to obtain a near-infrared shielding ultrafine particle dispersion body, the used solvent is not particularly limited, and may be appropriately selected in consideration of the resin binder (B) used in the dispersion body, molding conditions of the dispersion body, the use environment, and the like.

The solvent is selected from, for example, water, an organic solvent, oils and fats, a liquid plasticizer for a medium resin, a polymer monomer, or a mixture thereof.

Here, as the organic solvent, various solvents such as alcohols, ketones, hydrocarbons, glycols, and water can be selected. Specifically, alcoholic solvents such as methanol, ethanol, 1-propanol, isopropanol, butanol, pentanol, benzyl alcohol, diacetone alcohol; ketone solvents such as acetone, methyl ethyl ketone, methyl propyl ketone, methyl isobutyl ketone, cyclohexanone, isophorone; ester solvents such as 3-methyl-methoxy-propionate; glycol derivatives such as ethylene glycol monomethyl ether, ethylene glycol monoethyl ether, ethylene glycol isopropyl ether, propylene glycol monomethyl ether, propylene glycol monoethyl ether, propylene glycol methyl ether acetate, propylene glycol ethyl ether acetate; amides such as formamide, N-methylformamide, di methylformamide, dimethylacetamide, N-methyl-2-pyrrolidone; aromatic hydrocarbons such as toluene and xylene; ethylene chloride, chlorobenzene, etc., can be used. Then, among these organic solvents, particularly, dimethyl ketone, methyl ethyl ketone, methyl isobutyl ketone, toluene, propylene glycol monomethyl ether acetate, n-butyl acetate, etc., are preferable.

As the fats and oils, vegetable fats and oils derived from plants are preferable. As the vegetable oils, drying oils such as linseed oil, sunflower oil, and tung oil, semidrying oils such as sesame oil, cottonseed oil, rapeseed oil, soybean oil, rice bran oil, and the like, non-drying oils such as olive oil, coconut oil, palm oil, dehydrated castor oil, can be used. As the vegetable oil-derived compound, fatty acid monoesters and ethers obtained by direct esterification reaction of fatty acid of vegetable oil and monoalcohol can be used, and Isopar E, Exol Hexane, Exol Heptane, Exol E, Exol D30, Exol D40, Exol D60, Exol D80, Exol D95, Exol D110, Exol D130 (all manufactured by ExxonMobil), etc., can be selected.

Further, the liquid plasticizer for a medium resin includes: for example a plasticizer which is a compound of monohydric alcohol and organic acid ester, an ester-based plasticizer such as a polyhydric alcohol organic acid ester compound, and a phosphoric acid plasticizer such as an organic phosphoric acid plasticizer, each of which is preferably in a liquid state at room temperature. Among them, a plasticizer which is an ester compound synthesized from a polyhydric alcohol and a fatty acid is preferable.

The ester compound synthesized from polyhydric alcohol and fatty acid is not particularly limited, and includes for example, glycols such as triethylene glycol, tetraethylene glycol, and tripropylene glycol, a glycol ester compound obtained by a reaction between glycols such as triethylene glycol, tetraethylene glycol, tripropylene glycol, and monobasic organic acids such as butyric acid, isobutyric acid, caproic acid, 2-ethylbutyric acid, heptylic acid, n-octylic acid, 2-ethylhexylic acid, pelargonic acid (n-nonylic acid), and decylic acid, and also includes ester compounds of tetraethylene glycol and tripropylene glycol with the above-described monobasic organic compounds. Among them, fatty acid esters of triethylene glycol such as triethylene glycol dihexanate, triethylene glycol di-2-ethyl butyrate, and triethylene glycol di-octanoate, triethylene glycol di-2-ethyl hexanonate, are suitable. Triethylene glycol fatty acid esters are preferable.

Further, a polymer monomer is a monomer that forms a polymer by polymerization or the like, and a preferable polymer monomer used in the present invention includes methyl methacrylate monomer, acrylate monomer, styrene resin monomer, etc.

The liquid solvents described above can be used alone or in combination of two or more. Further, if necessary, pH may be adjusted by adding acid or an alkali to these liquid solvents.

(2) Dispersant

The dispersant used in the anti-counterfeit ink composition according to the present invention further improves dispersion stability of the composite tungsten oxide ultrafine particles in the composite tungsten oxide fine particle dispersion liquid, and avoids coarsening of dispersed particles due to re-aggregation. Therefore, addition of various dispersants, surfactants, coupling agents and the like is also preferable.

Although the dispersant, the coupling agent, and the surfactant can be selected according to the application, it is preferable to have an amine-containing group, a hydroxyl group, a carboxyl group, or an epoxy group as a functional group.

These functional groups have an effect of adsorbing on the surface of the composite tungsten oxide ultrafine particles to prevent aggregation and uniformly dispersing the composite tungsten oxide ultrafine particles according to the present invention in the near-infrared shielding ultrafine particle dispersion body. A polymeric dispersant having any of these functional groups in the molecule is more desirable.

(3) Weather Resistance Improver

The weather resistance improver (C) used in the composite tungsten oxide ultrafine particle dispersion liquid used in the present invention includes at least one selected from a benzotriazole-based UV absorber, a benzophenone-based UV absorber and a triazine-based UV absorber.

Examples of the benzotriazole-based UV absorber include
2-[2'-hydroxy-5'-(hydroxymethyl)phenyl]-2H-benzotriazole,
2-[2'-hydroxy-5'-(2-hydroxyethyl)phenyl]-2H-benzotriazole,
2-[2'-hydroxy-5'-(3-hydroxypropyl)phenyl]-2H-benzotriazole,
2-[2'-hydroxy-3'-methyl-5'-(hydroxymethyl)phenyl]-2H-benzotriazole,
2-[2'-hydroxy-3'-methyl-5'-(2-hydroxyethyl)phenyl]-2H-benzotriazole,
2-[2'-hydroxy-3'-methyl-5'-(3-hydroxypropyl)phenyl]-2H-benzotriazole,
2-[2'-hydroxy-3'-t-butyl-5'-(hydroxymethyl)phenyl]-2H-benzotriazole,
2-[2'-hydroxy-3'-t-butyl-5'-(2-hydroxyethyl)phenyl]-2H-benzotriazole,
2-[2'-hydroxy-3'-t-butyl-5'-(2-hydroxyethyl)phenyl]-5-chloro-2H-benzotriazole,
2-[2'-hydroxy-3'-t-butyl-5'-(3-hydroxypropyl)phenyl]-2H-benzotriazole,
2-[2'-hydroxy-3'-t-octyl-5'-(hydroxymethyl)phenyl]-2H-benzotriazole,
2-[2'-hydroxy-3'-t-octyl-5'-(2-hydroxyethyl)phenyl]-2H-benzotriazole,
2-[2'-hydroxy-3'-t-octyl-5'-(3-hydroxypropyl)phenyl]-2H-benzotriazole and the like,
or 2,2'-methylenebis[6-(2H-benzotriazol-2-yl)-4-(hydroxymethyl)phenol],
2,2'-methylenebis[6-(2H-benzotriazol-2-yl)-4-(2-hydroxyethyl)phenol],
2,2'-methylenebis[6-(5-chloro-2H-benzotriazol-2-yl)-4-(2-hydroxyethyl)phenol],
2,2'-methylenebis[6-(5-bromo-2H-benzotriazol-2-yl)-4-(2-hydroxyethyl)phenol],
2,2'-methylenebis[6-(2H-benzotriazol-2-yl)-4-(3-hydroxypropyl)phenol],
2,2'-methylenebis[6-(5-chloro-2H-benzotriazol-2-yl)-4-(3-hydroxypropyl)phenol],
2,2'-methylenebis[6-(5-bromo-2H-benzotriazol-2-yl)-4-(3-hydroxypropyl)phenol],
2,2'-methylenebis[6-(2H-benzotriazol-2-yl)-4-(4-hydroxybutyl)phenol],
2,2'-methylenebis[6-(5-chloro-2H-benzotriazol-2-yl)-4-(4-hydroxybutyl)phenol],
2,2'-methylenebis[6-(5-bromo-2H-benzotriazol-2-yl)-4-(4-hydroxybutyl)phenol],
3,3-{2,2'-bis[6-(2H-benzotriazol-2-yl)-1-hydroxy-4-(2-hydroxyethyl)phenyl]}propane,
2,2-{2,2'-bis[6-(2H-benzotriazol-2-yl)-1-hydroxy-4-(2-hydroxyethyl)phenyl]}butane,
2,2'-oxybis[6-(2H-benzotriazol-2-yl)-4-(2-hydroxyethyl)phenol], 2,2'-bis[6-(2H-benzotriazol-2-yl)-4-(2-hydroxyethyl)phenol]sulfide,
2,2'-bis[6-(2H-benzotriazol-2-yl)-4-(2-hydroxyethyl)phenol]sulfoxide,
2,2'-bis[6-(2H-benzotriazol-2-yl)-4-(2-hydroxyethyl)phenol]sulfone,
2,2'-bis[6-(2H-benzotriazol-2-yl)-4-(2-hydroxyethyl)phenol]amine, and the like.

Examples of the triazine-based UV absorber include
2-(2-hydroxy-4-hydroxymethylphenyl)-4,6-diphenyl-s-triazine,
2-(2-hydroxy-4-hydroxymethylphenyl)-4,6-bis(2,4-di methylphenyl)-s-triazine,
2-[2-hydroxy-4-(2-hydroxyethyl)phenyl]-4,6-diphenyl-s-triazine,
2-[2-hydroxy-4-(2-hydroxyethyl)phenyl]-4,6-bis(2,4-dimethylphenyl)-s-triazine,
2-[2-hydroxy-4-(2-hydroxyethoxy)phenyl]-4,6-diphenyl-s-triazine,
2-[2-hydroxy-4-(2-hydroxyethoxy)phenyl]-4,6-bis(2,4-dimethylphenyl)-s-triazine,
2-[2-hydroxy-4-(3-hydroxypropyl)phenyl]-4,6-diphenyl-s-triazine,
2-[2-hydroxy-4-(3-hydroxypropyl)phenyl]-4,6-bis(2,4-dimethylphenyl)-s-triazine,
2-[2-hydroxy-4-(3-hydroxypropoxy)phenyl]-4,6-diphenyl-s-triazine,
2-[2-hydroxy-4-(3-hydroxypropoxy)phenyl]-4,6-bis(2,4-dimethylphenyl)-s-triazine,
2-[2-hydroxy-4-(4-hydroxybutyl)phenyl]-4,6-diphenyl-s-triazine,
2-[2-hydroxy-4-(4-hydroxybutyl)phenyl]-4,6-bis(2,4-dimethylphenyl)-s-triazine,
2-[2-hydroxy-4-(4-hydroxybutoxy)phenyl]-4,6-diphenyl-s-triazine,
2-[2-hydroxy-4-(4-hydroxybutoxy)phenyl]-4,6-bis(2,4-dimethylphenyl)-s-triazine,
2-(2-hydroxy-4-hydroxymethylphenyl)-4,6-bis(2-hydroxy-4-methylphenyl)-s-triazine,
2-[2-hydroxy-4-(2-hydroxyethyl)phenyl]-4,6-bis(2-hydroxy-4-methylphenyl)-s-triazine,
2-[2-hydroxy-4-(2-hydroxyethoxy)phenyl]-4,6-bis(2-hydroxy-4-methylphenyl)-s-triazine,
2-[2-hydroxy-4-(3-hydroxypropyl)phenyl]-4,6-bis(2-hydroxy-4-methylphenyl)-s-triazine,
2-[2-hydroxy-4-(3-hydroxypropoxy)phenyl]-4,6-bis(2-hydroxy-4-methyl phenyl)-s-triazine,
2-[4,6-bis(2,4-dimethylphenyl)-1,3,5-triazine-2-yl]-5-(octyloxy)phenol,
2-(4,6-di phenyl-1,3,5-tri azine-2-yl)-5-[(hexyl)oxy]-phenol, and the like.

Examples of the benzophenone-based UV absorber include
2,2'-dihydroxy-4,4'-di(hydroxymethyl)benzophenone,
2,2'-dihydroxy-4,4'-di(2-hydroxyethyl)benzophenone,
2,2'-dihydroxy-3,3'-dimethoxy-5,5'-di(hydroxymethyl)benzophenone,
2,2'-dihydroxy-3,3'-dimethoxy-5,5'-di(2-hydroxyethyl)benzophenone,
2,2'-dihydroxy-3,3'-di(hydroxymethyl)-5,5'-dimethoxybenzophenone,
2,2'-dihydroxy-3,3'-di(2-hydroxyethyl)-5,5'-dimethoxybenzophenone,
2,2-dihydroxy-4,4-dimethoxybenzophenone, and the like.

An addition amount of the weather resistance improver (C) in the near-infrared shielding ultrafine particle dispersion body is preferably 0.1 to 10 parts by mass, more preferably 0.5 to 5 parts by mass, and still more preferably 0.6 to 5 parts by mass, based on 1 part by mass of the composite tungsten oxide ultrafine particles. Therefore, in anticipation of the above-described addition amount, the weather resistance improver (C) may be added and mixed when preparing the composite tungsten oxide ultrafine particle dispersion liquid.

(4) Dispersion Method

The composite tungsten oxide ultrafine particle dispersion liquid for producing the near-infrared shielding ultrafine particle dispersion body described below is obtained by mixing the composite tungsten oxide ultrafine particles, water, organic solvent, oil and fat, liquid plasticizer for medium resin, polymer monomer, or a solvent selected from these mixtures, and an appropriate amount of a dispersant, and further in the present invention, a weather resistance improver (C), then pulverizing and dispersing them. In addition to the above, a coupling agent, a surfactant and the like can be added to the composite tungsten oxide ultrafine particle dispersion liquid.

The method for dispersing the composite tungsten oxide ultrafine particles in the dispersion liquid is not particularly limited as long as the fine particles can be uniformly dispersed in the dispersion liquid without aggregation.

Examples of the dispersion method include a pulverization and dispersion treatment method using a device such as a bead mill, a ball mill, a sand mill, a paint shaker, an ultrasonic homogenizer, or the like. Among them, pulverization and dispersion with a medium stirring mill such as a bead mill, a ball mill, a sand mill, and a paint shaker using medium media such as beads, balls, and Ottawa sand, are preferable because the time required for obtaining a desired dispersed particle size is short.

Through pulverization and dispersion treatment using these media stirring mills, formation of the fine particles is accelerated due to collision of the composite tungsten oxide ultrafine particles and collision of media against the ultrafine particles simultaneously with the dispersion of the composite tungsten oxide ultrafine particles in the dispersion liquid, and the composite tungsten oxide ultrafine particles can be more finely pulverized and dispersed (namely, they are pulverized and dispersed).

When dispersing the composite tungsten oxide ultrafine particles in the plasticizer, it is also preferable to add an organic solvent having a boiling point of 120° C. or less, if desired. The organic solvent having the boiling point of 120° C. or less specifically includes toluene, methyl ethyl ketone, methyl isobutyl ketone, butyl acetate, isopropyl alcohol, and ethanol. However, the organic solvent can be arbitrarily selected, as long as the fine particles exhibiting a near-infrared absorption function at a boiling point of 120° C. or less can be uniformly dispersed. However, when the organic solvent is added, it is preferable that after the dispersion is completed, the drying step is performed, and an amount of the organic solvent remaining in a near-infrared shielding intermediate film described later is 5 mass % or less when obtaining the near-infrared shielding intermediate film as an example of the near infrared absorbing ultrafine particle dispersion body. This is because when the residual solvent in the near-infrared shielding intermediate film is 5 mass % or less, no bubbles are generated in a near-infrared shielding laminated structure described later, and an appearance and optical properties are kept good.

(5) Dispersed Particle Size

The dispersed particle size of the composite tungsten oxide ultrafine particles present in the composite tungsten oxide ultrafine particle dispersion liquid is 1 nm or more and 200 or less, and in this case, the light in the visible light region with a wavelength of 380 nm to 780 nm is not scattered due to geometric scattering or Mie scattering, and haze is reduced, and visible light transmittance can be increased, which is preferable. Further, when the dispersed particle size becomes 200 nm or less, a Rayleigh scattering region is formed, and in the Rayleigh scattering region, the scattered light is reduced in proportion to the sixth power of the particle size, and therefore the scattering is reduced and the transparency is improved as the dispersed particle size is decreased. Therefore, when the dispersed particle size is 200 nm or less, the scattered light becomes very small, and Blue haze phenomenon can be suppressed, and therefore the transparency is further increased, which is preferable.

Here, the dispersed particle size of the composite tungsten oxide ultrafine particles in the composite tungsten oxide ultrafine particle dispersion liquid will be briefly described. The dispersed particle size of the composite tungsten oxide ultrafine particles means the size of a single particle of the composite tungsten oxide ultrafine particles dispersed in the solvent, and a size of aggregated particles obtained by aggregating the composite tungsten oxide ultrafine particles, and can be measured with various commercially available particle size distribution meters. For example, a sample of the composite tungsten oxide ultrafine particle dispersion liquid is collected, and the sample can be measured using ELS-8000 manufactured by Otsuka Electronics Co., Ltd. based on a dynamic light scattering method.

Further, the composite tungsten oxide ultrafine particle dispersion liquid in which the content of the composite tungsten oxide ultrafine particles obtained by the above synthesis method is 0.01 mass % or more and 80 mass % or less, has excellent liquid stability, which is preferable. When an appropriate liquid medium, dispersant, coupling agent, and surfactant are selected, no gelation of the dispersion liquid or sedimentation of particles occurs for 6 months or more even when placed in a constant temperature bath at a temperature of 40° C., and the dispersed particle size can be maintained in a range of 1 to 200 nm.

Note that there is sometimes a difference between the dispersed particle size of the composite tungsten oxide ultrafine particle dispersion liquid, and the average particle size of the composite tungsten oxide ultrafine particles dispersed in near-infrared absorbing material ultrafine particle dispersion body. This is because the aggregation of the composite tungsten oxide ultrafine particles is solved when processing from the composite tungsten oxide ultrafine particle dispersion liquid to the near-infrared absorbing material ultrafine particle dispersion body by adding the dispersion liquid to the solid medium, even if the composite tungsten oxide ultrafine particles aggregate in the composite tungsten oxide ultrafine particle dispersion liquid.

(6) Binder, and Other Additives

The composite tungsten oxide ultrafine particle dispersion liquid may appropriately contain at least one selected from resin binders (B). The type of the resin binder (B) contained in the composite tungsten oxide ultrafine particle dispersion liquid is not particularly limited, but a thermoplastic resin such as a UV curable resin and an acrylic resin, a thermosetting resin such as an epoxy resin, or the like can be used as the resin binder (B).

Further, in order to improve the near-infrared absorption properties of the composite tungsten oxide ultrafine particle dispersion body according to the present invention, a boride represented by a general formula $XB_m$ (wherein X is a metal element selected from alkaline earth elements or rare earth elements including yttrium, satisfying $4 \leq m \leq 6.3$) may also be preferably added as needed to the composite tungsten oxide ultrafine particle dispersion liquid according to the present invention, depending on desired near-infrared shielding properties. An addition ratio at this time may be appropriately selected according to desired near-infrared absorption properties.

Further, in order to adjust a color tone of the composite tungsten oxide ultrafine particle dispersion body, known inorganic pigments such as carbon black and red iron oxide and known organic pigments can also be added. A known UV absorber, a known near-infrared shielding material for organic substances, and a phosphorus-based coloring inhibitor may be added to the composite tungsten oxide ultrafine particle dispersion liquid.

[e] Near-Infrared Shielding Ultrafine Particle Dispersion Body

Explanation will be given for the near-infrared shielding ultrafine particle dispersion body according to the present invention in which ultrafine particles having near-infrared shielding properties are dispersed.

The near-infrared shielding ultrafine particle dispersion body according to the present invention is formed using the composite tungsten oxide ultrafine particle dispersion liquid obtained by the above-described production method.

Namely, the near-infrared shielding ultrafine particle dispersion body according to the present invention is obtained by dispersing composite tungsten oxide ultrafine particles (A) having near-infrared shielding properties in a solid medium. The composite tungsten oxide ultrafine particles (A) are composite tungsten oxide ultrafine particles represented by a general formula $M_xW_yO_z$, and having the XRD peak top intensity value of 0.13 or more based on the XRD peak intensity ratio value of 1 on plane (220) of a silicon powder standard sample. The solid medium contains a resin binder (B) and a weather resistance improver (C). The weather resistance improver (C) contains at least one selected from benzotriazole-based UV absorber, triazine-based UV absorber, and benzophenone-based UV absorber The present invention is characterized in that the near-infrared shielding ultrafine particle dispersion body of the present invention contains the composite tungsten oxide ultrafine particles (A) in an amount of 0.001 mass % or more and 80 mass % or less. When the composite tungsten oxide ultrafine particles (A) are contained in the amount of 0.001 mass % or more, a near-infrared shielding effect required for the near-infrared shielding ultrafine particle dispersion body can be easily obtained. Further, when the composite tungsten oxide ultrafine particles (A) are contained in the amount of 80 mass % or less, the proportion of the resin binder (B) component in the near-infrared shielding ultrafine particle dispersion body can be increased, and a strength of the dispersion body can be secured.

Hereinafter, the composite tungsten oxide ultrafine particle dispersion body according to the present invention will be described in an order of (1) a solid medium, (2) a production method, and (3) an additive.

(1) A Solid Medium

A solid medium used for the composite tungsten oxide ultrafine particle dispersion body according to the present invention contains the weather resistance improver (C) in addition to the resin binder (B) which is a main component.

Hereinafter, the solid medium will be described in an order of (i) a resin binder and (ii) a weather resistance improver.

(i) A Resin Binder

Examples of the resin binder (B) include a thermoplastic resin, a thermosetting resin, and an UV curable resin.

Specifically, thermoplastic resin such as acrylic resin, thermosetting resin such as epoxy resin, UV curable resin such as silicone resin, epoxy resin, vinyl ester resin, acrylic resin, allyl ester resin, and the like can be used.

As a more specific type of the resin, the resin binder (B) may be any one of the following resins: a resin selected from a resin group of polyethylene terephthalate resin, polycarbonate resin, acrylic resin, styrene resin, polyamide resin, polyethylene resin, vinyl chloride resin, olefin resin, epoxy resin, polyimide resin, fluororesin, ethylene-vinyl acetate copolymer, polyvinyl acetal resin, ionomer resin, silicone resin, or a mixture of two or more resins selected from the above resin group, or a copolymer of two or more resins selected from the above resin group.

It is also preferable to add a polymer dispersant to these resin binders (B), the polymer dispersant having a group containing amine in its main framework, a hydroxyl group, a carboxyl group, or an epoxy group as a functional group.

As examples of the resin binder (B) used in the present invention, an acrylic resin, a fluorine resin, and a silicone resin will be described. However, the present invention is not limited to these resin binders (B).

Examples of the acrylic resin include a monomer of the acrylic resin, a homopolymer or a copolymer of two or more of these monomers, and a copolymer of the monomer and another copolymerizable monomer.

Specifically, examples of an acrylic resin monomer include alkyl (meth)acrylate such as methyl (meth)acrylate, ethyl (meth)acrylate, propyl (meth)acrylate, iso-propyl (meth)acrylate, butyl (meth)acrylate, iso-butyl (meth)acrylate, t-butyl (meth)acrylate, pentyl (meth)acrylate, amyl (meth)acrylate, iso-amyl (meth)acrylate, hexyl (meth)acrylate, heptyl (meth)acrylate, octyl (meth)acrylate, iso-octyl (meth)acrylate, ethylhexyl (meth)acrylate, nonyl (meth) acrylate, decyl (meth)acrylate, iso-decyl (meth)acrylate, undecyl (meth)acrylate, dodecyl (meth)acrylate, lauryl (meth)acrylate, stearyl (meth)acrylate, iso-stearyl (meth) acrylate; hydroxyalkyl (meth)acrylate such as hydroxyethyl (meth)acrylate, 2-hydroxypropyl (meth)acrylate, 4-hydroxybutyl (meth)acrylate, 3-hydroxypropyl (meth)acrylate, 2-hydroxybutyl (meth)acrylate, 3-hydroxybutyl (meth)acrylate; phenoxyalkyl (meth)acrylate such as phenoxyethyl (meth)acrylate, 2-hydroxy-3-phenoxypropyl (meth)acrylate; alkoxyalkyl (meth)acrylate such as 2-methoxyethyl (meth) acrylate, 2-ethoxyethyl (meth)acrylate, 2-propoxyethyl (meth)acrylate, 2-butoxyethyl (meth)acrylate, 2-methoxybutyl (meth)acrylate; polyalkyleneglycol (meth)acrylate such as polyethyleneglycol mono(meth)acrylate, ethoxydiethyleneglycol (meth)acrylate, methoxypolyethyleneglycol (meth)acrylate, phenoxypolyethyleneglycol (meth)acrylate, nonylphenoxypolyethyleneglycol (meth)acrylate, polypropyleneglycol mono(meth)acrylate, methoxypolypropyleneglycol (meth)acrylate, ethoxypolypropyleneglycol (meth)acrylate, nonylphenoxypolypropyleneglycol (meth) acrylate; pentaerythritol tri(meth)acrylate, pentaerythritol penta(meth)acrylate, dipentaerythritol hexa(meth)acrylate, glycerine di(meth)acrylate and the like.

Examples of fluoroplastics include polytetrafluoroethylene (PTFE), tetrafluoroethylene/hexafluoropropylene copolymer (FEP), tetrafluoroethylene/perfluoroalkyl vinyl ether copolymer (PFA), polyvinylidene fluoride (PVDF), polychlorotrifluoroethylene (PCTFE), tetrafluoroethylene/ethylene copolymer (ETFE), fluoroethylene vinyl ether (FEVE), ethylene chlorotrifluoroethylene copolymer (ECTFE), and a polymer A having the following structure:

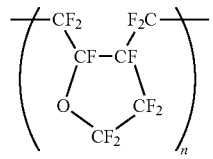

(N = 10-1000)

Among them, the polymer A and fluoroethylene vinyl ether (FEVE) are preferable. These (co) polymers may further have functional groups (eg, alkoxysilyl group, hydroxyl group, amino group, imino group, (meth) acryloyloxy group, epoxy group, carboxyl group, sulfonyl group, acrylate-type isocyanurate group, sulfate group). Preferable examples of commercially available fluororesins include Lumiflon (registered trademark, manufactured by Asahi Glass Co., Ltd.), CYTOP (registered trademark, manufactured by Asahi Glass Co., Ltd.), Zeffle (registered trademark, manufactured by Daikin Chemical Co., Ltd.), and Optool (registered trademark, manufactured by Daikin Chemical Co., Ltd.).

Further, examples of silicone resin include straight silicone varnish and modified silicone varnish. The straight silicone varnish is usually produced by hydrolysis polymerization of phenyltrichlorosilane, diphenyldichlorosilane, methyltrichlorosilane, and dimethyldichlorosilane (when used, it is generally cured at 100° C. or higher after coating). The modified silicone varnish is obtained by reacting a resin such as alkyd, polyester, acrylic, or epoxy with a silicone varnish. Preferred examples of commercially available silicone resins include silicone varnish KR series (manufactured by Shin-Etsu Chemical Co., Ltd.).

(ii) Weather Resistance Improver

In the present invention, the solid medium contains the weather resistance improver (C) described above, in addition to the resin binder (B), which is a main component of the solid medium described above.

As described above, the weather resistance improver (C) is preferably contained in the composite tungsten oxide ultrafine particle dispersion liquid used for producing the composite tungsten oxide ultrafine particle dispersion body according to the present invention. Then, the weather resistance improver (C) contains at least one selected from the benzotriazole-based UV absorber, the benzophenone-based UV absorber and the triazine-based UV absorber.

An addition amount of the weather resistance improver (C) is preferably 0.1 to 10 parts by mass based on 1 part by mass of the composite tungsten oxide ultrafine particles. This is because when the addition amount of the weather resistance improver (C) is 0.1 part by mass or more, an effect of suppressing color tone change can be sufficiently obtained, which is preferable, and when the addition amount is 10 parts by mass or less, the haze of the near-infrared shielding ultrafine particle dispersion body is suppressed and a design is secured, which is preferable. Further preferably, the addition amount of the weather resistance improver (C) is 0.1 to 1.67 parts by mass based on 1 part by mass of the composite tungsten oxide ultrafine particles. This is because the weather resistance improver itself slightly absorbs short-wavelength light in the visible light region, and therefore the transparency of the near-infrared shielding ultrafine particle dispersion body increases as the addition amount of the weather resistance improver decreases.

When excellent transparency and design of the near-infrared shielding ultrafine particle dispersion body are required, a desired near-infrared shielding ultrafine particle dispersion body excellent in transparency and design can be obtained by the above addition amount of the weather resistance improver.

(2) Production Method

A method for producing the near-infrared shielding ultrafine particle dispersion body will be described below.

First, as described above, the composite tungsten oxide ultrafine particles, the solvent, the dispersant, and further, in the present invention, the weather resistance improver (C) are mixed, and a mixture is pulverized and dispersed by a medium stirring mill to obtain a composite tungsten oxide ultrafine particle liquid. Then, the composite tungsten oxide ultrafine particle dispersion liquid is dispersed in a solid medium, to obtain a composite tungsten oxide ultrafine particle dispersed resin composition. Then, the resin composition is pelletized to obtain a masterbatch.

Further, the above-described composite tungsten oxide ultrafine particles, the powder or pellets of the solid medium, and other additives as necessary are uniformly mixed, and then a mixture is kneaded with a vent type single screw or twin screw extruder, and then, is processed into pellets by a method of cutting a general melt-extruded kneaded product, to thereby obtain a masterbatch. In this case, examples of the shape of the masterbatch include a columnar shape and a prismatic shape. Further, it is also possible to employ a so-called hot cut method of directly cutting the melt extrudate. In this case, generally, the masterbatch has a shape close to a spherical shape.

In the masterbatch production process described above, it is preferable that the solvent contained in the composite tungsten oxide ultrafine particle dispersion liquid is removed to an amount that is allowed to remain in the masterbatch.

The resin binder (B) used for preparing the composite tungsten oxide ultrafine particle dispersion liquid is added and kneaded into the obtained masterbatch. Thereby, a near-infrared shielding material fine particle dispersion body can be obtained, with its dispersion concentration adjusted, while maintaining a dispersion state of the composite tungsten oxide ultrafine particles contained in the composite tungsten oxide ultrafine particle dispersed resin composition.

Note that the dispersed particle size of the composite tungsten oxide ultrafine particles is the same as that described in "(d) Dispersed particle size of the composite tungsten oxide ultrafine particle dispersion liquid", and even in the composite tungsten oxide ultrafine particle dispersion body, the dispersed particle size of the composite tungsten oxide ultrafine particles dispersed and present in the dispersion body is preferably 1 nm or more and 200 nm or less. When the dispersed particle size is 200 nm or less, a Rayleigh scattering region is formed, and in the Rayleigh scattering region, an amount of scattered light is very small, and a blue haze phenomenon can be suppressed, and therefore transparency is further increased, which is preferable.

On the other hand, it is also acceptable that the monomer, oligomer and uncured liquid medium resin precursor of the resin binder (B) are mixed with the composite tungsten oxide ultrafine particles, to obtain the composite tungsten oxide ultrafine particle dispersion liquid, and then the monomer or the like is cured by a chemical reaction such as condensation or polymerization.

For example, when using an acrylic resin as the resin binder (B), acrylic monomer or acrylic UV curable resin are mixed with the composite tungsten oxide ultrafine particles, to obtain the composite tungsten oxide ultrafine particle dispersion liquid, and the composite tungsten oxide ultrafine particle dispersion liquid is filled in a predetermined mold and the like and subjected to radical polymerization, to obtain the composite tungsten oxide ultrafine particle dispersion body using the acrylic resin.

When a resin that cures by crosslinking, such as an ionomer resin, is used as the resin binder (B), as in the case of using the acrylic resin described above, a dispersion body can be obtained by performing a cross-linking reaction with the composite tungsten oxide ultrafine particle dispersion liquid.

Further, the composite tungsten oxide ultrafine particle dispersion liquid can be obtained by mixing the composite tungsten oxide ultrafine particles and a liquid medium. Here, known liquid plasticizers can be used for the liquid medium. The near-infrared shielding ultrafine particle dispersion body can be obtained by mixing the obtained composite tungsten oxide ultrafine particle dispersion liquid with the medium resin, and removing the liquid medium by a known heat treatment until the liquid medium is allowed to remain in near-infrared shielding material fine particle dispersion body. Note that when a liquid plasticizer is used for the liquid medium, an entire amount of the liquid plasticizer may remain in the near-infrared shielding ultrafine particle dispersion body.

Further, a near-infrared shielding coating layer can be obtained by mixing the above-described composite tungsten oxide ultrafine particle dispersion liquid with a solid medium such as a resin or a polymer monomer to prepare a coating liquid and form a coating layer on a transparent substrate by a known method. The near-infrared shielding coating layer is a near-infrared shielding ultrafine particle dispersion body in which composite tungsten oxide ultrafine particles are dispersed in a solid medium. In this event, although a thickness of the near-infrared shielding coating layer is not particularly limited, the near-infrared shielding ultrafine particle dispersion body is preferably provided as a coating layer having a thickness of 1 μm or more and 10 μm or less.

(3) Additive

When using the resin binder (B) as the solid medium, usually, known additives such as a plasticizer, a flame retardant, a coloring inhibitor and a filler can be added to these resin binders (B). However, the solid medium is not limited to the resin binder (B), and an inorganic binder (B) using a metal alkoxide can also be used. As the metal alkoxide, alkoxides such as Si, Ti, Al, and Zr are typical. A dispersion body including an oxide layer can be formed by hydrolyzing and condensing the inorganic binder (B) using these metal alkoxides by heating or the like.

[f] Sheet-Like, Board-Like or Film-Like Near-Infrared Shielding Ultrafine Particle Dispersion Body which is an Example of the Near-Infrared Shielding Ultrafine Particle Dispersion Body, Near-Infrared Shielding Intermediate Film It is preferable that the near-infrared shielding ultrafine particle dispersion body according to the present invention is in the form of a sheet, board, or film-like near-infrared shielding ultra-fine particle dispersion body.

The sheet-like, board-like or film-like near-infrared shielding ultrafine particle dispersion body described above can be produced, for example, by kneading any one selected from the above-described composite tungsten oxide ultrafine particles, composite tungsten oxide ultrafine particle dispersion liquid, and master batch, while adding a plasticizer and other additives to obtain a kneaded product, and thereafter forming the kneaded product into a flat or curved surface by a known extrusion molding method, injection molding method, calendar roll method, casting method, inflation method, or the like.

When producing the sheet-like, board-like or film-like near-infrared shielding ultrafine particle dispersion body according to the present invention, various resins can be used for the resin binder (B) mainly constituting the sheet, film, and board. However, it is preferable to select the resin binder (B) such as a thermoplastic resin or a thermosetting resin having sufficient transparency, in consideration of the fact that the sheet-like, board-like or film-like near-infrared shielding ultrafine particle dispersion body is applied as a near-infrared shielding body or an optical filter.

The near-infrared shielding ultrafine particle dispersion body processed into a sheet, board, or film can be applied to various uses. An embodiment of the near-infrared shielding ultrafine particle dispersion body includes a near-infrared shielding intermediate film.

In a laminated structure in which the interlayer is sandwiched between two or more transparent substrates selected from, for example, plate glass and transparent plastic, which transmit at least visible light, the interlayer includes one or more intermediate films, and the above-described sheet-like, board-like or film-like near-infrared shielding ultrafine particle dispersion body can be used as the interlayer that exhibits near-infrared shielding function. With this configuration, the near-infrared shielding laminated structure that has a near-infrared shielding function while transmitting visible light can be obtained.

As the transparent substrate, a plate glass, a plate-like plastic, or a film-like plastic which is transparent in the visible light region is used. The material of the plastic is not particularly limited and can be selected according to the purpose of use. Specifically, polycarbonate resin, acrylic resin, polyethylene terephthalate resin, polyamide resin, vinyl chloride resin, olefin resin, epoxy resin, polyimide resin, ionomer resin, fluorine resin, etc., can be used.

Further, as another embodiment of the near-infrared shielding laminated structure according to the present invention, the sheet-like, board-like or film-like near-infrared shielding ultrafine particle dispersion body according to the present invention can be used as the near-infrared shielding intermediate film, specifically, which can be obtained by preparing a laminated structure in which the near infrared shielding intermediate film is sandwiched between a plurality of transparent substrates first, and integrally combining this laminated structure and the other laminated structure or the transparent substrate facing each other by a known method such as thermocompression bonding.

Note that the near-infrared shielding intermediate film is one of the embodiments of the near-infrared shielding ultrafine particle dispersion body according to the present invention. It is a matter of course that the near-infrared shielding intermediate film can be used as the near-infrared shielding ultrafine particle dispersion body without being sandwiched between two or more transparent substrates that transmit the visible light, depending on the purpose of use.

[g] Near-Infrared Shielding Ultrafine Particle Dispersion Body Used as a Coating Layer which is an Example of a Near-Infrared Shielding Ultrafine Particle Dispersion Body, and Near-Infrared Shielding Intermediate Film The composite tungsten oxide ultrafine particle dispersion liquid described in "(2) production method" is used as it is as a coating liquid, applied on a transparent substrate, dried, and cured, to thereby form a coating layer on the transparent substrate, and this coating layer can be used as the coating layer of the near-infrared shielding ultrafine particle dispersion body.

In this case, an entire body of the transparent substrate on which the coating layer is provided can be regarded as a near-infrared shielding ultrafine particle dispersion body having a near-infrared shielding coating layer laminated thereon. Then, the near-infrared shielding laminated structure having the near-infrared shielding function while transmitting visible light can be obtained by using the near-infrared shielding ultrafine particle dispersion body with the near-infrared shielding coating layer laminated thereon, as the interlayer in the laminated structure including the interlayer sandwiched between two or more transparent substrates that transmit visible light.

The above-described near-infrared shielding coating layer is preferably formed on a resin film. Preferable resin films include polyethylene terephthalate (PET) film, polyethylene naphthalate (PEN) film, and polyethylene butyrate film, and among them, PET film is preferable. A thickness of the resin film is not particularly limited, but is generally preferably 10 to 400 μm, and particularly preferably 20 to 200 μm. Further, a resin film surface may be subjected to an adhesive treatment such as a corona treatment, a plasma treatment, a flame treatment, or a primer layer coating treatment in advance to improve adhesiveness.

As the resin binder (B) of the near-infrared shielding coating layer described above, any of the above-described resin binders (B) can be appropriately selected and used. For example, an UV curable resin, a thermosetting resin, an electron beam curable resin, a room temperature curable resin, a thermoplastic resin, or the like can be selected according to the purpose.

Specifically, examples thereof include: polyethylene resin, polyvinyl chloride resin, polyvinylidene chloride resin, polyvinyl alcohol resin, polystyrene resin, polypropylene resin, ethylene vinyl acetate copolymer, polyester resin, polyethylene terephthalate resin, fluororesin, ionomer resin, polycarbonate resin, acrylic resin, polyvinyl butyral resin, PET resin, polyamide resin, polyimide resin, and olefin resin. Further, polymer dispersants having these resins as the main framework and having amine-containing groups, hydroxyl groups, carboxyl groups, or epoxy groups as functional groups, may be used for the medium resin. These resins may be used alone or in combination. However, among the resin binders (B) for the coating layer, it is particularly preferable to use the UV curable resin from a viewpoint of productivity, device cost, and the like.

It is also possible to use an inorganic binder (B) using metal alkoxide or organosilazane. As the metal alkoxide, alkoxides such as Si, Ti, Al, and Zr are typical. The inorganic binder (B) using these metal alkoxides enables to form a coating layer as an oxide layer by being subjected to hydrolysis and condensation polymerization by heating etc.

A method for providing the near-infrared shielding coating layer on a substrate film or a substrate glass, which is a transparent substrate, may be a method capable of uniformly applying the near-infrared shielding ultrafine particle dispersion liquid on a substrate surface, and is not particularly limited. For example, bar coating, gravure coating, spray coating, dip coating, spin coating, screen printing, roll coating, sink coating, etc., can be used.

For example, according to the bar coating using the UV curable resin, a coating layer can be formed by applying a coating liquid with liquid concentration and additives appropriately adjusted to have appropriate leveling properties, on a substrate film or a substrate glass using a wire bar with a bar number that can ensure a coating layer thickness that can satisfy a content of the ultrafine particles having near-infrared shielding properties. Then, a coating layer can be formed on the substrate film or the substrate glass by irradiation of the ultraviolet rays to cure the coating layer after removing the solvent contained in the coating layer by drying. In this event, a drying condition for the coating layer is usually about 20 seconds to 10 minutes at a temperature of 60° C. to 140° C., although it depends on each component, solvent type and usage ratio. There is no particular limitation on the irradiation of the ultraviolet rays, and for example, an ultraviolet exposure device such as an ultra-high pressure mercury lamp can be suitably used.

Further, an adhesion between the substrate and the coating layer can be improved, smoothness of the coating layer at the time of coating can be improved, and a drying property of the organic solvent, etc., can be improved by performing predetermined pre- and post-steps when forming the near-infrared shielding coating layer described above. The pre- and post-steps include for example, a substrate surface treatment step, pre-bake (pre-heating of substrate) step, post-bake (post-heating of substrate) step, etc., and can be appropriately selected. A heating temperature in the pre-bake step and/or the post-bake step is preferably 80° C. to 200° C., and a heating time is preferably 30 seconds to 240 seconds.

When the above-described coating layer is cured, it is preferable to add a polymerization initiator to the coating liquid in advance. For example, when thermally curing the coating layer, it is preferable to add a thermal polymerization initiator to the coating liquid, and when curing the coating layer with ultraviolet rays, it is preferable to add a photo-polymerization initiator to the coating liquid.

Examples of the thermal polymerization initiator include: t-butyl hydroperoxide, di-t-butyl peroxide, lauroyl peroxide, benzoyl peroxide, dimyristyl peroxydicarbonate, t-butyl peroxyacetate, organic peroxides such as t-butyl peroxy (2-ethylhexanoate) and cumyl peroxy octoate, Azo compounds such as azobisisobutyronitrile and azobiscyclohexanenitrile, etc.

As the photopolymerization initiator, any compound suitable for a nature of the resin can be used. Examples of the photopolymerization initiator include: acetophenones such as 2-hydroxy-2-methyl-1-phenylpropan-1-one, 1-hydroxycyclohexylphenyl ketone, 2-methyl-1-(4-(methylthio) phenyl)-2-morpholinopropane-1; benzoin series such as benzyl dimethyl ketal; Benzophenones such as benzophenone, 4-phenylbenzophenone and hydroxybenzophenone; thioxanthones such as isopropylthioxanthone and 2-4-diethyl-thioxanthone; and methylphenylglyoxylate, etc., as other specialty materials, and particularly preferably 2-hydroxy-2-methyl-1-phenylpropan-1-one, 1-hydroxycyclohexylphenyl ketone, 2-methyl-1-(4-(methylthio) phenyl)-2-morpholinopropane-1, benzophenone, etc.

These photopolymerization initiators can be used by mixing with one or more kinds of known and commonly used photopolymerization accelerators such as benzoic acids such as 4-dimethylaminobenzoic acid or tertiary amines at an arbitrary proportion if necessary. Further, the photopolymerization initiator can be used alone or in combination of two or more. Particularly, 1-hydroxycyclohexyl phenyl ketone (Irgacure 184, manufactured by Ciba Specialty Chemicals) is preferable.

An addition amount of the photopolymerization initiator is generally 0.1 to 10 mass %, preferably 0.1 to 5 mass % based on the coating liquid.

[h] Near Infrared Shielding Laminated Structure Using Near Infrared Shielding Intermediate Film The near-infrared shielding laminated structure according to the present invention is a near-infrared shielding laminated structure including two or more transparent substrates and an interlayer sandwiched between the two or more transparent substrates, and the interlayer includes one or more intermediate films, and the sheet-like or film-like near-infrared shielding intermediate film of the present invention described above is used as at least one layer of the intermediate film.

The transparent substrate is a laminated structure that is any one selected from a sheet glass, a plastic, and a plastic containing fine particles having a near-infrared shielding function.

Further, as another embodiment of the near-infrared shielding laminated structure according to the present invention, there is a laminated structure in which the interlayer includes one or more intermediate films, at least one layer of the intermediate film is the near-infrared shielding intermediate film of the present invention described above, and the intermediate film is the near-infrared shielding ultrafine particle dispersion body according to the present invention, and is sandwiched between two resin sheets formed using a polyvinyl acetal resin or an ethylene/vinyl acetate (EVA) copolymer resin.

As the transparent substrate described above, a plate glass, a plate-like plastic, or a film-like plastic which is transparent in a visible light region is used. The material of the plastic is not particularly limited and can be selected according to the purpose of use, and polycarbonate resin, acrylic resin, polyethylene terephthalate resin, PET resin, polyamide resin, vinyl chloride resin, olefin resin, epoxy resin, polyimide resin, ionomer resin, fluorine resin, etc., can be used. Further, a plastic containing fine particles having a near-infrared shielding function may be used for the transparent substrate.

The near-infrared shielding laminated structure according to the present invention is configured such that the interlayer includes one or more intermediate films, wherein a sheet-like or film-like near-infrared shielding intermediate film according to the present invention is used as the intermediate film, and can be obtained by bonding and integrating the interlayer with a plurality of opposing transparent substrates by a known method such as thermocompression bonding. The thermocompression bonding method is not particularly limited, and may be a conventionally known method, for example, using an autoclave or the like.

The interlayer may have a laminated structure including a plurality of intermediate films. When the interlayer includes a plurality of intermediate films, at least one layer may be the near-infrared shielding intermediate film according to the present invention. Further, at least one layer of the intermediate films may contain an UV absorber. Examples of the UV absorber includes: a compound having a malonic ester structure, a compound having an oxalic anilide structure, a compound having a benzotriazole structure, a compound having a benzophenone structure, a compound having a triazine structure, a compound having a benzoate structure, a compound having a hindered amine structure, etc.

Note that the interlayer may be constituted only by the near-infrared shielding intermediate film according to the present invention.

A thickness of the near-infrared shielding intermediate film used in the near-infrared shielding laminated structure according to the present invention is preferably 50 μm to 1000 μm.

Further, the near-infrared shielding laminated structure according to the present invention is configured using a material having excellent visible light transmittance as described above, and the haze value is 5% or less when the visible light transmittance is set to 70% or more. Here, as a method for evaluating the haze value, for example, a commercially available haze meter may be used, and the haze value may be measured based on JIS K7105.

Thereby, the near-infrared shielding laminated structure according to the present invention has an excellent heat shielding performance widely applied to window materials of buildings, window materials of automobiles, trains, aircrafts and the like, and in addition, excellent in design, and therefore can be used in a wide range of fields.

EXAMPLES

The present invention will be described in detail hereafter, with reference to examples, but the present invention is not limited by the following examples.

Note that the optical properties of the dispersion liquid and the coating layer in the examples and comparative examples were measured using a spectrophotometer (U-4100, manufactured by Hitachi, Ltd.), and the visible light transmittance and the solar transmittance were measured according to JIS R 3106.

Further, the dispersed particle size was shown by an average value measured by a particle size measuring device (ELS-8000 manufactured by Otsuka Electronics Co., Ltd.) based on a dynamic light scattering method as a principle.

Further, the content of the volatile component contained in the composite tungsten oxide ultrafine particles (A) in examples and comparative examples was measured using a moisture meter (MOC 63u, manufactured by Shimadzu Corporation). In the measurement, a temperature of a measurement sample was raised from room temperature to 125° C. for 1 minute from start of the measurement, held at 125° C. for 9 minutes, and a weight reduction rate after 10 minutes from the start of the measurement was taken as the content of the volatile component.

The dispersed particle size of the composite tungsten oxide ultrafine particles (A) dispersed in the near-infrared shielding material ultrafine particle body and the near-infrared shielding intermediate film was measured by observing a transmission electron microscope image of a cross section of the dispersion body and the intermediate film. The transmission electron microscope image was observed using a transmission electron microscope (HF-2200, made by Hitachi High-Technologies Corporation). The transmission electron microscope image was processed with an image processing apparatus, the particle size of 100 composite tungsten oxide ultrafine particles was measured, and an average value was defined as an average particle size.

An X-ray diffraction pattern was measured by a powder X-ray diffraction method (θ-2θ method) using a powder X-ray diffractometer (X'Pert-PRO/MPD manufactured by Spectris Co., Ltd. PANalytical). Further, in order to ensure objective quantification, every time the X-ray diffraction pattern of the composite tungsten oxide ultrafine particles (A) was measured, the X-ray diffraction pattern of a silicon powder standard sample (640c, manufactured by NIST) was measured, and the value of the peak intensity ratio was calculated by taking the XRD peak top intensity ratio value of the composite tungsten oxide ultrafine particles (A) each time, based on the XRD peak intensity value of 1 of the X-ray diffraction pattern on the (220) plane.

Example 1

<Production of Composite Tungsten Oxide Ultrafine Particles>

0.216 kg of $Cs_2CO_3$ was dissolved in 0.330 kg of water, which was then added to 1.000 kg of $H_2WO_4$, sufficiently stirred, and then dried to obtain a mixed powder in which the ratio of the Cs element to the W element is the ratio of the Cs element to the W element in a target composition $Cs_{0.33}WO_3$.

Next, the inside of the reaction system was evacuated to about 0.1 Pa by a vacuum evacuation device, and then the inside of the reaction system was completely replaced with argon gas to obtain a flow system of 1 atm, using a high-frequency plasma reaction device (high frequency plasma generator manufactured by Sumitomo Metal Mining Co., Ltd., water-cooled double quartz heavy pipe with an inner diameter of 70 mm and a length of 213 mm manufactured by Japan High Frequency Co., Ltd.) described in FIG. 1. Thereafter, argon gas was introduced as a plasma gas into the reaction vessel at a flow rate of 30 L/min, and the argon gas and a helium gas were introduced as a sheath gas from a sheath gas feed port at a flow rate of 55 L/min of argon gas and 5 L/min of helium gas. Then, high-frequency power was applied to a water cooled copper coil for generating high-frequency plasma, to generate high-frequency plasma. At this time, in order to generate thermal plasma having a high temperature part of 10000 to 15000 K, the high-frequency power was set to 40 KW.

After generating the high-frequency plasma, the mixed powder was supplied into the thermal plasma at a rate of 50 g/min while feeding the argon gas as a carrier gas at a flow rate of 9 L/min from the gas feeding device.

As a result, the mixed powder was instantaneously evaporated in the thermal plasma, and rapidly solidified in a process of reaching a plasma tail flame part, resulting in ultrafine particles. The generated ultrafine particles were deposited on a recovery filter. The production conditions therefore are shown in table 1.

The deposited fine particles were collected, and an X-ray diffraction pattern was measured by a powder X-ray diffraction method (θ-2θ method) using a powder X-ray diffractometer (X'Pert-PRO/MPD manufactured by Spectris Co., Ltd. PANalytical).

Figure 2:
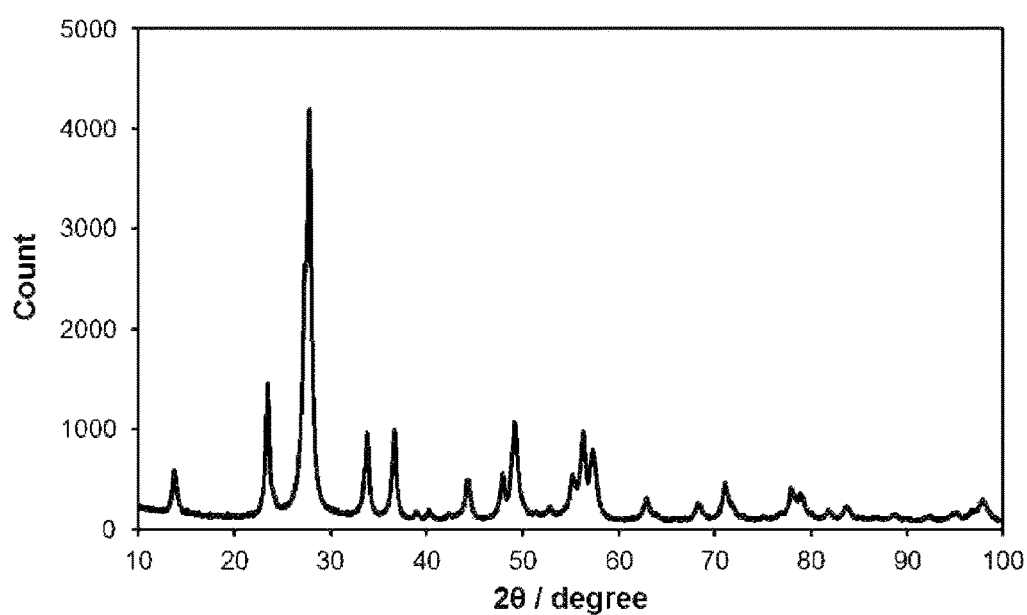
FIG. 2 is an X-ray diffraction pattern of ultrafine particles according to Example 1.

The X-ray diffraction pattern of the obtained ultrafine particles is shown in FIG. 2. As a result of phase identification, the obtained ultrafine particles were identified as hexagonal $Cs_{0.33}WO_3$ single phases. Note that no different phases were observed.

Further, when crystal structure analysis by the Rietveld analysis method was performed using the X-ray diffraction pattern, the crystallite size of each obtained fine particles was 18.8 nm. Further, the peak top intensity value of the X-ray diffraction pattern of the obtained composite tungsten oxide ultrafine particles was 4200 counts.

The composition of the obtained ultrafine particles before pulverization was examined by ICP emission spectrometry. As a result, Cs concentration was 13.6 mass %, W concentration was 65.3 mass %, and a molar ratio of Cs/W was 0.29. It was confirmed that a remained part other than Cs and W was oxygen and no other impurity element contained in an amount of 1 mass % or more was present.

When a BET specific surface area of the obtained composite tungsten oxide ultrafine particles (A) was measured using a BET specific surface area measuring device (HM model 1208 manufactured by Mountech), it was 60.0 m²/g. Note that nitrogen gas having a purity of 99.9% was used for measurement of the BET specific surface area.

Further, the content of the volatile component of the composite tungsten oxide ultrafine particles of example 1 was measured, and it was found to be 1.6 mass %.

<Composite Tungsten Oxide Ultrafine Particle Dispersion Liquid>

20 parts by mass of the obtained composite tungsten oxide ultrafine particles (A), 64 parts by mass of an organic solvent: methyl isobutyl ketone (MIBK), and 16 parts by mass of an acrylic polymer dispersant having amine-containing group as a functional group (acrylic dispersant having an amine value of 48 mg KOH/g and a decomposition temperature of 250° C.) (referred to as "dispersant a" hereafter) were mixed, to prepare 3 kg of slurry.

This slurry was put into a medium stirring mill together with beads, and pulverized and dispersed for one hour.

Note that as the medium stirring mill, a horizontal cylindrical annular type (manufactured by Ashizawa Co., Ltd.) was used, and zirconia was used for the inner wall of the vessel and the rotor (rotary stirring portion). Further, beads made of YSZ (Yttria-Stabilized Zirconia) having a diameter of 0.1 mm were used as the beads. A rotational speed of the rotor was 14 rpm/second, and a pulverization and dispersion treatment were performed at a slurry flow rate of 0.5 kg/min, to obtain the near-infrared shielding ultrafine particle dispersion liquid according to Example 1. Table 2 shows the composition of the near-infrared shielding ultrafine particle dispersion liquid of Example 1.

The peak top intensity value in the X-ray diffraction pattern of the composite tungsten oxide ultrafine particles (A) contained in the obtained near-infrared shielding ultrafine particles dispersion liquid, that is, the composite tungsten oxide ultrafine particles (A) after the pulverization and dispersion treatment was measured, and it was found to be 3000 counts, and the peak position was found to be 2θ=27.8°. On the other hand, a silicon powder standard sample (640c produced by NIST) was prepared and the XRD peak intensity value based on (220) plane of the silicon powder standard sample was measured, and it was found to be 19800 counts. Accordingly, the XRD peak intensity ratio value of the composite tungsten oxide ultrafine particles (A) was found to be 0.15 after the pulverization and dispersion treatment, based on the peak intensity value of 1 of the standard sample.

Further, the crystallite size of each composite tungsten oxide ultrafine particle of Example 1 after the pulverization and dispersion treatment was 16.9 nm.

Further, the dispersed particle size in the composite tungsten oxide ultrafine particle dispersion liquid of Example 1 was measured using a particle size analyzer based on the dynamic light scattering method, and it was found to be 70 nm. Note that as a setting of the dispersed particle size measurement, a particle refractive index was set to 1.81, and a particle shape was set as non-spherical. The background was measured using methyl isobutyl ketone, and the solvent refractive index was 1.40. Table 3 shows the measurement results.

<Near-Infrared Shielding Ultrafine Particle Dispersion Body Used as a Coating Layer>

Resin binder (B): 50 parts by mass of acrylic ultraviolet curing resin: Aronix UV3701 (manufactured by Toa Gosei), weather resistance improver (C): 60 parts by mass of benzotriazole UV absorber 2-(2-hydroxy-5-methidylphenyl) benzotriazole Sumisorb 200 (Sumisorb is a registered trademark) manufactured by Sumitomo Chemical Co., and a suitable amount of methyl isobutyl ketone as a solvent, were mixed, to prepare a coating liquid for forming a near-infrared shielding layer. Table 2 shows the composition of the coating liquid for forming a near-infrared ray shielding layer according to Example 1.

In this event, the concentration of the coating liquid for forming a near-infrared shielding layer was adjusted by diluting the solvent with methyl isobutyl ketone, so that the visible light transmittance of the near-infrared shielding laminated structure described later was 70%.

The obtained coating liquid for forming a near-infrared shielding layer was applied on a stretched polyester film having a thickness of 50 μm, using a bar coater (IMC-700 manufactured by Imoto Seisakusho).

After evaporating the solvent from the obtained coating layer, it is cured by irradiation of the ultraviolet rays using a high-pressure mercury lamp, to obtain a near-infrared shielding layer which is the near-infrared shielding ultrafine particle dispersion body of Example 1.

The dispersed particle size (average particle size) of the composite tungsten oxide ultrafine particles (A) dispersed in the obtained near-infrared shielding ultrafine particle dispersion body of Example 1 was calculated by an image processing apparatus using a transmission electron microscopic image, and it was found to be 17 nm which was almost the same as the above-described crystallite size of 16.9 nm.

Further, the haze value of the obtained near-infrared shielding ultrafine particle dispersion body according to Example 1 was measured based on JISK7105, using a haze meter (HM-150 manufactured by Murakami Color Research Laboratory), and it was found to be 1.3%.

Further, the near-infrared shielding ultrafine particle dispersion body of Example 1 was irradiated with pseudo-sunlight using artificial sun lighting (XC-100 manufactured by Celic Corporation), and presence or absence of a blue haze phenomenon was visually confirmed, and the absence of the blue haze phenomenon was confirmed.

Further, optical properties of the obtained near-infrared shielding ultrafine particle dispersion body of Example 1: visible light transmittance T (unit: %), solar transmittance ST (unit: %) were measured using a spectrophotometer U-4000 (manufactured by Hitachi, Ltd.). As described above, the visible light transmittance was adjusted to be 70%, and a solar radiation transmittance was obtained from an obtained transmission profile and found to be 38.7%.

Subsequently, in order to evaluate weather resistance outdoors, the near-infrared shielding ultrafine particle dispersion body was irradiated with ultraviolet rays for 1 hour using an ultraviolet irradiation apparatus, and thereafter optical properties: haze (H), visible light transmittance T (unit: %), solar transmittance ST (unit: %) were measured using a spectrophotometer U-4000 (manufactured by Hitachi, Ltd.). Then, the visible light transmittance T, the solar transmittance ST, and the haze value H were found to be 69%/o, 38.0%, and 1.3%, respectively. Table 4 shows the measurement results.

<Near-Infrared Shielding Laminated Structure>

The near-infrared shielding layer, which is the near-infrared shielding ultrafine particle dispersion body of Example 1 described above, was sandwiched between two polyvinyl butyral sheets (thickness 0.38 mm), and thereafter was subjected to press molding for 30 minutes under conditions of 120° C. and 100 kg/cm² using a press molding machine, to obtain a near-infrared shielding intermediate film. Then, the near-infrared shielding intermediate film is sandwiched between two plate-like soda-lime glasses (thickness: 3 mm), and thereafter heated at 80° C. to be temporarily bonded, and was subjected to main bonding in an autoclave under conditions of 120° C. and 14 kg/cm², to obtain a near-infrared shielding laminated structure according to Example 1.

Examples 2 to 6

Composite tungsten oxide ultrafine particles (A) according to Examples 2 to 6 were produced, in the same manner as in the example 1 except that the carrier gas flow rate, the plasma gas flow rate, the sheath gas flow rate, and the raw material feed rate were respectively changed to a predetermined value, and a composite tungsten oxide ultrafine particle dispersion liquid was produced using the obtained composite tungsten oxide ultrafine particles (A). Table 1 shows changed carrier gas flow rate conditions, raw material feed rate conditions, and other conditions.

The obtained composite tungsten oxide ultrafine particles (A) and the composite tungsten oxide ultrafine particle dispersion liquid according to Examples 2 to 6 were evaluated in the same manner as in Example 1. Tables 2 and 3 show the evaluation results.

Further, a near-infrared shielding layer, which is the near-infrared shielding ultrafine particle dispersion body of each of Examples 2 to 6, was obtained under the same conditions as in obtaining the near-infrared shielding ultrafine particle dispersion body of Example 1 except that the composite tungsten oxide ultrafine particle dispersion liquid of Examples 2 to 6 was used, and the same evaluation was performed. Table 4 shows the evaluation results.

Example 7

Composite tungsten oxide ultrafine particles (A) according to Example 7 were obtained under the same conditions as in Example 1 for producing the composite tungsten oxide ultrafine particles (A) except that the mixed powder of $Cs_2CO_3$ and $H_2WO_4$ described in Example 1 were changed to composite tungsten oxide represented by $Cs_{0.33}WO_3$ fired at 800° C. in a mixed gas atmosphere of nitrogen gas and hydrogen gas to obtain a raw material to be charged into a high frequency plasma reactor.

A near-infrared shielding ultrafine particle dispersion liquid according to Example 7 was produced under the same condition as in Example 1, using the obtained composite tungsten oxide ultrafine particles (A). The obtained composite tungsten oxide ultrafine particles (A) and the dispersion liquid thereof were evaluated in the same manner as in Example 1. Tables 1 to 3 show the production conditions and the evaluation results.

Further, a near-Infrared shielding ultrafine particle dispersion body according to Example 7 was obtained under the same condition as in obtaining the near-infrared shielding ultrafine particle dispersion body of Example 1 except that the near-infrared shielding ultrafine particle dispersion liquid of Example 7 was used, and the same evaluation was performed. Table 4 shows the evaluation results.

Example 8

Composite tungsten oxide ultrafine particles (A) according to Example 8 were obtained in the same manner as in Example 7 except that the carrier gas flow rate was changed to 6 L/min and the raw material feed rate was changed to 25 g/min.

A near-infrared shielding ultrafine particle dispersion liquid according to Example 8 was produced under the same condition as in Example 1, using the obtained composite tungsten oxide ultrafine particles (A). The obtained composite tungsten oxide ultrafine particles (A) and the dispersion liquid thereof were evaluated in the same manner as in Example 1. Tables 1 to 3 show the production conditions and the evaluation results.

Further, a near-infrared shielding ultrafine particle dispersion body according to Example 8 was obtained under the same condition as in obtaining the near-infrared shielding ultrafine dispersion body of Example 1 except that the near-infrared shielding ultrafine particle dispersion liquid of Example 8 was used, and the same evaluation was performed. Table 4 shows the evaluation results.

Example 9

0.148 kg of $Rb_2CO_3$ was dissolved in 0.330 kg of water, which was then added to 1.000 kg of $H_2WO_4$, sufficiently stirred, and then dried to obtain a mixed powder in which the ratio of the Rb element to the W element is the ratio of the Cs element to the W element in a target composition $Rb_{0.32}WO_3$.

Composite tungsten oxide ultrafine particles (A) according to Example 9 were obtained in the same manner as in Example 1 except that the obtained mixed powder of $Rb_2CO_3$ and $H_2WO_4$ was used as a raw material to be charged into a high-frequency plasma reactor, instead of the mixed powder of $Cs_2CO_3$ and $H_2WO$ described in Example 1.

The obtained composite tungsten oxide ultrafine particles (A) were identified as hexagonal $Rb_{0.33}WO_3$ single phases from the X-ray diffraction pattern. Note that no different phases were observed.

A near-infrared shielding ultrafine particle dispersion liquid according to Example 9 was produced under the same conditions as in Example 1, using the obtained composite tungsten oxide ultrafine particles (A). The obtained composite tungsten oxide ultrafine particles (A) and the dispersion liquid thereof were evaluated in the same manner as in Example 1. Tables 1 to 3 show the production conditions and the evaluation results.

Further, a near-infrared shielding ultrafine particle dispersion body according to Example 9 was obtained under the same condition as in obtaining the near-infrared shielding ultrafine particle dispersion body of Example 1, except that the near-infrared shielding ultrafine particle dispersion liquid of Example 9 was used, and the same evaluation was performed. Table 4 shows the evaluation results.

Example 10

100 parts by mass of the near-infrared shielding ultrafine particle dispersion liquid prepared in Example 3, resin binder (B): 50 parts by mass of acrylic UV curable resin: Aronix UV3701 (manufactured by Toa Gosei); weather resistance improver (C): 2 parts by mass of benzotriazole UV absorber 2-(2-hydroxy-5-methidylphenyl) benzotriazole, Sumisorb 200 (product name) (Sumisorb is a registered trademark) manufactured by Sumitomo Chemical Co., Ltd.; and a suitable amount of methyl isobutyl ketone for solvent were mixed, to prepare a coating liquid for forming a near-infrared shielding layer according to Example 10.

In this event, the concentration of the coating liquid for forming a near-infrared shielding layer was adjusted by diluting the solvent with methyl isobutyl ketone so that the visible light transmittance of a near-infrared shielding laminated structure described later is 70%.

A near-infrared shielding ultrafine particle dispersion body, that is, a near-infrared shielding layer, a near infrared shielding intermediate film, a near-infrared shielding laminated structure according to Example 10 were obtained under the same condition as in obtaining the near-infrared shielding ultrafine particle dispersion body of Example 1, using the obtained coating liquid for forming a near-infrared shielding layer, and the same evaluation was performed. Table 4 shows the evaluation results.

Example 11

100 parts by mass of the near-infrared shielding ultrafine particle dispersion liquid prepared in Example 3; resin binder (B): 50 parts by mass of acrylic UV curable resin: Aronix UV3701 (manufactured by Toa Gosei); weather resistance improver (C): 200 parts by mass of benzotriazole UV absorber 2-(2-hydroxy-5-methidylphenyl) benzotriazole, Sumisorb 200 (product name) (Sumisorb is a registered trademark) manufactured by Sumitomo Chemical Co., Ltd.; and a suitable amount of methyl isobutyl ketone for solvent were mixed, to prepare a coating liquid for forming a near-infrared shielding layer according to Example 11.

In this event, the concentration of the coating liquid for forming a near-infrared shielding layer was adjusted by diluting the solvent with methyl isobutyl ketone so that the visible light transmittance of a near-infrared shielding laminated structure described later is 70%.

A near-infrared shielding layer, a near-infrared shielding intermediate film, and a near-infrared shielding laminated structure according to Example 11 were obtained under the same condition as in obtaining the near-infrared shielding ultrafine particle dispersion body of Example 1, using the obtained coating liquid for forming a near-infrared shielding layer, and the same evaluation was performed. Table 4 shows the evaluation results.

Example 12

100 parts by mass of the near-infrared shielding ultrafine particle dispersion liquid prepared in Example 3; resin binder (B): 50 parts by mass of acrylic UV curable resin: Aronix UV3701 (manufactured by Toa Gosei); weather resistance improver (C): 60 parts by mass of benzotriazole UV absorber 2-(2-hydroxy-4-n-octoxybenzophenone, Sumisorb 130 (product name) (Sumisorb is a registered trademark) manufactured by Sumitomo Chemical Co., Ltd.; and a suitable amount of methyl isobutyl ketone for solvent were mixed, to prepare a coating liquid for forming a near-infrared shielding layer according to Example 12.

In this event, the concentration of the coating liquid for forming a near-infrared shielding layer was adjusted by diluting the solvent with methyl isobutyl ketone so that the visible light transmittance of a near-infrared shielding laminated structure described later is 70%.

A near-infrared shielding layer, a near-infrared shielding intermediate film, and a near-infrared shielding laminated structure according to Example 12 were obtained under the same condition as in obtaining the near-infrared shielding ultrafine particle dispersion body of Example 1, using the obtained coating liquid for forming a near-infrared shielding layer, and the same evaluation was performed. Table 4 shows the evaluation results.

Example 13

A coating liquid for forming a near-infrared shielding layer according to Example 13 was prepared in the same manner as in Example 12, except that the weather resistance improver (C) was changed to B-3: Triazine-based ultraviolet absorber {2,4-bis[2-hydroxy-4-butoxyphenyl]-6-(2,4-dibutoxyphenyl)-1,3-5-triazine (BASF) Tinuvin 460 (product name) (Tinuvin is a registered trademark).

In this event, the concentration of the coating liquid for forming a near-infrared shielding layer was adjusted by diluting the solvent with methyl isobutyl ketone so that the visible light transmittance of a near-infrared shielding laminated structure described later is 70%.

A near-infrared shielding layer, a near-infrared shielding intermediate film, and a near-infrared shielding laminated structure according to Example 13 were obtained under the same condition as in obtaining the near-infrared shielding ultrafine particle dispersion body of Example 1, using the obtained coating liquid for forming a near-infrared shielding layer, and the same evaluation was performed. Table 4 shows the evaluation results.

Example 14

A coating liquid for forming a near-infrared shielding layer according to Example 14 was prepared in the same manner as in Example 12, except that the weather resistance improver (C) was changed to B-1: 30 parts by mass of benzotriazole UV absorber 2-(2-hydroxy-5-methidylphenyl) benzotriazole, Sumisorb 200 (product name) (Sumisorb is a registered trademark), and to B-2: 30 parts by mass of benzophenone UV absorber, 2-hydroxy-4-n-octoxybenzophenone, Sumisorb 130 (product name) (Sumisorb is a registered trademark).

In this event, the concentration of the coating liquid for forming a near-infrared shielding layer was adjusted by diluting the solvent with methyl isobutyl ketone so that the visible light transmittance of a near-infrared shielding laminated structure described later is 70%.

A near-infrared shielding layer, a near-infrared shielding intermediate film, and a near-infrared shielding laminated structure of Example 14 were obtained under the same condition as in obtaining the near-infrared shielding ultrafine particle dispersion body of Example 1, using the obtained coating liquid for forming a near-infrared shielding layer, and the same evaluation was performed. Table 4 shows the evaluation results.

Example 15

A coating liquid for forming a near-infrared shielding layer according to Example 15 was prepared in the same manner as in Example 12, except that the weather resistance improver (C) was changed to B-1: 30 parts by mass of benzotriazole UV absorber {2-(2-hydroxy-5-methidylphenyl) benzotriazole, Sumisorb 200 (product name) (Sumisorb is a registered trademark), and to B-3: 30 parts by mass of triazine-based UV absorber 2,4-bis (2-hydroxy-4-butoxyphenyl)-6-(2,4-dibutoxyphenyl)-1,3-5-triazine, Tinuvin 460 (product name) (Tinuvin is a registered trademark) manufactured by BASF Co., Ltd.

In this event, the concentration of the coating liquid for forming a near-infrared shielding layer was adjusted by diluting the solvent with methyl isobutyl ketone so that the visible light transmittance of a near-infrared shielding laminated structure described later is 70%.

A near-infrared shielding layer, a near-infrared shielding intermediate film, and a near-infrared shielding laminated structure of Example 15 were obtained under the same condition as in obtaining the near-infrared shielding ultrafine particle dispersion body of Example 1, using the obtained coating liquid for forming a near-infrared shielding layer, and the same evaluation was performed. Table 4 shows the evaluation results.

Example 16

A coating liquid for forming a near-infrared shielding layer according to Example 16 was prepared in the same manner as in Example 12, except that the weather resistance improver (C) was changed to B-2: 30 parts by mass of benzophenone UV absorber, 2-hydroxy-4-n-octoxybenzophenone, Sumisorb 130 (product name) (Sumisorb is a registered trademark), and to B-3: 30 parts by mass of triazine UV absorber, 2,4-bis[2-hydroxy-4-butoxyphenyl]-6-(2,4-dibutoxyphenyl)-1,3-5-triazine, Tinuvin 460 (product name) (Tinuvin is a registered trademark) manufactured by BASF Co., Ltd.

In this event, the concentration of the coating liquid for forming a near-infrared shielding layer was adjusted by diluting the solvent with methyl isobutyl ketone so that the visible light transmittance of a near-infrared shielding laminated structure described later is 70%.

A near-infrared shielding layer, a near-infrared shielding intermediate film, and a near-infrared shielding laminated structure of Example 16 were obtained under the same condition as in obtaining the near-infrared shielding ultrafine particle dispersion body of Example 1, using the obtained coating liquid for forming a near-infrared shielding layer, and the same evaluation was performed. Table 4 shows the evaluation results.

Comparative Example 1

<Production of the Composite Tungsten Oxide Ultrafine Particles>

Composite tungsten oxide ultrafine particles (A) according to Comparative Example 1 were prepared in the same manner as in Example 1 except that the carrier gas flow rate was changed to 3 L/min of argon gas, and the raw material feed rate was changed to 15 g/min. Tables 1 and 2 show the changed carrier gas flow rate conditions, raw material feed rate conditions, and other conditions.

<Composite Tungsten Oxide Ultrafine Particle Dispersion Liquid>

A near-infrared shielding ultrafine particle dispersion liquid according to Comparative Example 1 was obtained under the same condition as in Example 1, using the obtained composite tungsten oxide ultrafine particles (A).

The obtained composite tungsten oxide ultrafine particles (A) and the dispersion liquid thereof were evaluated in the same manner as in Example 1. Table 3 shows the evaluation results.

<Near-Infrared Shielding Ultrafine Particle Dispersion Body Used as a Coating Layer>

100 parts by mass of the near-infrared shielding ultrafine particle dispersion liquid of Comparative Example 1; resin binder (B): 50 parts by mass of acrylic UV curable resin: Aronix UV3701 (product name) (manufactured by Toa Gosei); and a suitable amount of methyl isobutyl ketone for solvent were mixed, to prepare a coating liquid for forming a near-infrared shielding layer according to Comparative Example 1 without adding weather resistance improver (C).

In this event, the concentration of the coating liquid for forming a near-infrared shielding layer was adjusted by diluting the solvent with methyl isobutyl ketone so that the visible light transmittance of a near-infrared shielding laminated structure described later is 70%.

A coating layer, a near infrared shielding layer, and a near infrared shielding intermediate film were obtained in the same manner as in Example 1, using the obtained coating liquid for forming a near-infrared shielding layer according to Comparative Example 1, and the near-infrared shielding laminated structure was obtained in the same manner as in Example 1, using the near infrared shielding intermediate film.

Optical properties of the obtained near-infrared shielding laminated structure of Comparative Example 1 were evaluated. Table 4 shows the evaluation results.

Comparative Example 2

<Production of the Composite Tungsten Oxide Ultrafine Particles>

Composite tungsten oxide ultrafine particles (A) according to Comparative Example 2 were prepared in the same manner as in Example 1, except that the plasma gas flow rate was changed to argon gas 15 L/min. Tables 1 and 2 show the changed plasma gas flow rate conditions and the other conditions.

<Composite Tungsten Oxide Ultrafine Particle Dispersion Liquid>

A near-infrared shielding ultrafine particle dispersion liquid according to Comparative Example 2 was obtained in the same manner as in Example 1, using the obtained composite tungsten oxide ultrafine particles (A) of Comparative Example 2. The obtained composite tungsten oxide ultrafine particles (A) of Comparative Example 2 and the dispersion liquid thereof were evaluated in the same manner as in Example 1. Table 3 shows the evaluation results.

<Near-Infrared Shielding Ultrafine Particle Dispersion Body Used as a Coating Layer>

100 parts by mass of the near-infrared shielding ultrafine particle dispersion liquid of Comparative Example 2; resin binder (B): 50 parts by mass of acrylic UV curable resin: Aronix UV3701 (product name) (manufactured by Toa Gosei); weather resistance improver (C): 1 part by mass of B-2: Benzophenone UV absorber, 2-hydroxy-4-n-octoxybenzophenone, Sumisorb 130 (product name) (Sumisorb is a registered trademark) manufactured by Sumitomo Chemical Co., Ltd.; and a suitable amount of methyl isobutyl ketone for solvent were mixed, to prepare a coating liquid for forming a near-infrared shielding layer.

In this event, the concentration of the coating liquid for forming a near-infrared shielding layer was adjusted by diluting the solvent with methyl isobutyl ketone so that the visible light transmittance of a near-infrared shielding laminated structure described later is 70%.

A coating layer, a near-infrared shielding layer, and a near-infrared shielding intermediate film were obtained in the same manner as in Example 1, using the obtained coating liquid for forming a near-infrared shielding layer of Comparative Example 2. Further, a near-infrared shielding laminated structure was obtained in the same manner as in Example 1, using the near-infrared shielding intermediate film. Optical properties of the obtained near-infrared shielding laminated structure of Comparative Example 2 were evaluated. Table 4 shows the evaluation results.

Comparative Example 3

<Production of the Composite Tungsten Oxide Ultrafine Particles>

Composite tungsten oxide ultrafine particles (A) according to Comparative Example 3 were prepared under the same condition as in Example 1, except that high-frequency power for generating high-frequency plasma was set to 15 kW.

<Composite Tungsten Oxide Ultrafine Particle Dispersion Liquid>

A near-infrared shielding ultrafine particle dispersion liquid according to Comparative Example 3 was obtained under the same condition as in Example 1, using the obtained composite tungsten oxide ultrafine particles (A).

The obtained composite tungsten oxide ultrafine particles (A) of Comparative Example 3 and the dispersion liquid thereof were evaluated in the same manner as in Example 1. Table 3 shows the evaluation results.

<Near-Infrared Shielding Ultrafine Particle Dispersion Body Used as a Coating Layer>

100 parts by mass of the near-infrared shielding ultrafine particle dispersion liquid of Comparative Example 3; resin binder (B): 50 parts by mass of acrylic UV curable resin, Aronix UV3701 (product name) (manufactured by Toa Gosei); weathering resistance improver (C): B-3: 400 parts by mass of triazine-based ultraviolet absorber 2,4-bis[2-hydroxy-4-butoxyphenyl]-6-(2,4-dibutoxyphenyl)-1,3-5-triazine, Tinuvin 460 (product name) (Tinuvin is a registered trademark) manufactured by BASF Co., Ltd.; and a suitable amount of methyl isobutyl ketone for solvent were mixed, to prepare a coating liquid for forming a near-infrared shielding layer according to Comparative Example 3.

In this event, the concentration of the coating liquid for forming a near-infrared shielding layer of Comparative Example 3 was adjusted by diluting the solvent with methyl isobutyl ketone so that the visible light transmittance of a near-infrared shielding laminated structure described later is 70%.

A coating layer, a near-infrared shielding layer, and a near-infrared shielding intermediate film were obtained in the same manner as in Example 1, using the obtained coating liquid for forming a near-infrared shielding layer according to Comparative Example 3. Then, a near-infrared shielding laminated structure according to Comparative Example 3 was obtained in the same manner as in Example 1.

Optical properties of the obtained near-infrared shielding combined structure of Comparative Example 3 were evaluated. Table 4 shows the evaluation results.

(Conclusion)

In Examples 1 to 6, $Cs_2CO_3$ and $H_2WO_4$ were used as a raw material mixed powder.

Then, the raw material mixed powder was instantly evaporated in thermal plasma using a high-frequency plasma reactor and by selecting a suitable raw material mixed powder feed rate, plasma gas flow rate, and carrier gas flow rate, and the evaporated raw material is condensed in the course of reaching a plasma tail flame part, and is rapidly solidified outside of the plasma flame, to thereby obtain the composite tungsten oxide ultrafine particles (A) of the present invention.

As shown in Table 3, the obtained composite tungsten oxide ultrafine particles (A) were identified as hexagonal $Cs_{0.33}WO_3$ single phases having excellent near-infrared shielding properties. Further, in the X-ray diffraction pattern of the composite tungsten oxide ultrafine particles (A), the composite tungsten oxide ultrafine particles (A) have the XRD peak top intensity ratio of 0.13 or more based on the XRD peak intensity ratio value of 1 on plane (220) of a silicon powder standard sample, and have high crystallinity and high transparency in the visible light region.

By dispersing the ultrafine composite tungsten oxide particles (A) of Examples 1 to 6 together with resin binder (B) in the solid medium containing the weather resistance improver (C) having a specific structure and by optimizing the addition amount, the near-infrared shielding ultrafine particle dispersion body of Examples 1 to 6 with suppressed change in color tone during outdoor use can be obtained.

By using the near-infrared shielding ultrafine particle dispersion body of Examples 1 to 6, it was confirmed that the near-infrared shielding intermediate film and the near-infrared shielding laminated structure of Examples 1 to 6 were obtained, and it was also confirmed that the laminated structures of Examples 1 to 6 using the composite tungsten oxide ultrafine particles (A) of Examples 1 to 6 have excellent near-infrared shielding properties.

In Examples 7 and 8, the composite tungsten oxide represented by $Cs_{0.33}WO_3$ obtained by firing the mixed powder of $Cs_2CO_3$ and $H_2WO_4$ described in Example 1 at 800° C. in the mixed gas atmosphere of nitrogen gas and hydrogen gas, was used as a raw material to be charged into a high frequency plasma reactor. Also, when using the composite tungsten oxide as a material to be charged, it was confirmed that the composite tungsten oxide ultrafine particles (A) of the present invention can be obtained by selecting the raw material feed rate and carrier gas flow rate in the same manner as in Examples 1 to 6.

As shown in Table 3, the obtained composite tungsten oxide ultrafine particles (A) of Examples 7 and 8 are identified as hexagonal $Cs_{0.33}WO_3$ single phases having excellent near-infrared shielding properties, and in the X-ray diffraction pattern of the composite tungsten oxide ultrafine particles (A), the composite tungsten oxide ultrafine particles (A) have the XRD peak top intensity ratio of 0.13 or more based on the XRD peak intensity ratio value of 1 on plane (220) of a silicon powder standard sample, and have high crystallinity and high transparency in the visible light region similarly to Examples 1 to 6.

Then, it was confirmed that the laminated structure using the composite tungsten oxide ultrafine particles (A) have excellent near-infrared shielding properties.

Further, in the same manner as in Examples 1 to 6, it was confirmed that by dispersing the composite tungsten oxide ultrafine particles (A) together with the resin binder (B) in the solid medium containing weather resistance improver (C) and by optimizing the addition amount, the near-infrared shielding ultrafine particle dispersion body with suppressed change in color tone during outdoor use can be obtained, and the near-infrared shielding intermediate film and the near-infrared shielding laminated structure using the near-infrared shielding ultrafine particle dispersion body can be obtained.

Example 9 is an example using hexagonal $Rb_{0.33}WO_3$ as the composite tungsten oxide ultrafine particles (A). In the X-ray diffraction pattern of the composite tungsten oxide ultrafine particles (A), the composite tungsten oxide ultrafine particles (A) of Example 9 have the XRD peak top intensity ratio of 0.13 or more based on the XRD peak intensity ratio value of 1 on plane (220) of a silicon powder standard sample, and have high crystallinity and high transparency in the visible light region similarly to hexagonal $Cs_{0.33}WO_3$ of Examples 1 to 8. As a result, it was confirmed that the laminated structure using the composite tungsten oxide ultrafine particles (A) have excellent near-infrared shielding properties, due to high transparency and high crystallinity in the visible light range.

Further, in the same manner as in Examples 1 to 6, it was confirmed that by dispersing the composite tungsten oxide ultrafine particles (A) together with the resin binder (B) in the solid medium containing weather resistance improver (C) and by optimizing the addition amount, the near-infrared shielding ultrafine particle dispersion body with suppressed change in color tone during outdoor use can be obtained, and the near-infrared shielding intermediate film and the near-infrared shielding laminated structure using the near-infrared shielding ultrafine particle dispersion body can be obtained.

In Examples 10 to 16, the composite tungsten oxide ultrafine particles (A) were prepared, which were produced in the same manner as in Example 3, and these composite tungsten oxide ultrafine particles (A) were dispersed together with the resin binder (B) in the solid medium containing weather resistance improver (C). It was confirmed that by optimizing the type and amount of the weather resistance improver (C), the near-infrared shielding ultrafine particle dispersion body with suppressed change in color tone during outdoor use can be obtained, and the near-infrared shielding intermediate and the near-infrared shielding laminated structure using the near-infrared shielding ultrafine particle dispersion body can be obtained.

Comparative Example 1 is a case where the raw material feed rate and the carrier gas flow rate in the high-frequency plasma reactor are out of suitable conditions. The obtained composite tungsten oxide ultrafine particles (A) are ultrafine particles having a large specific surface area and a low crystallite size and low crystallinity, and the XRD peak top ratio value did not satisfy 0.13 or more which is requested by the present invention.

Further, the near-infrared shielding ultrafine particle dispersion body of Comparative Example 1 obtained using the composite tungsten oxide ultrafine particles (A) of Comparative Example 1 did not contain the weather resistance improver (C) of the present invention.

It was confirmed that due to greatly reduced visible light transmittance after UV irradiation test and change of the color tone of the near-infrared shielding ultrafine particle dispersion body to a dark color, the near-infrared shielding ultrafine particle dispersion body of Comparative Example 1 is not the near-infrared shielding ultrafine particle dispersion body with suppressed change in color tone during outdoor use, which is the characteristic of the present invention.

Comparative Example 2 is a case where the plasma gas flow rate in the high-frequency plasma reactor is out of suitable conditions. The obtained composite tungsten oxide ultrafine particles (A) are ultrafine particles having a large specific surface area and a low crystallite size and low crystallinity, and the XRD peak top ratio value did not satisfy 0.13 or more which is requested by the present invention.

Further, the near-infrared shielding ultrafine particle dispersion body of Comparative Example 2 obtained using the composite tungsten oxide ultrafine particles (A) of Comparative Example 2 was the near-infrared shielding ultrafine particle dispersion body having a low content of the weather resistance improver (C) of the present invention.

It was confirmed that due to greatly reduced visible light transmittance after UV irradiation test and change of the color tone of the near-infrared shielding ultrafine particle dispersion body to a dark color, the near-infrared shielding ultrafine particle dispersion body of Comparative Example 2 is not the near-infrared shielding ultrafine particle dispersion body with suppressed change in color tone during outdoor use, which is the characteristic of the present invention.

Comparative Example 3 is a case where a high-frequency power for plasma generation in the high-frequency plasma reactor is low and out of suitable conditions. The obtained composite tungsten oxide ultrafine particles (A) are not identified as hexagonal $Cs_{0.33}WO_3$ single phases, and other phases such as $WO_2$ and W are mixed, and the XRD peak top intensity ratio value did not satisfy 0.13 or more which is requested by the present invention.

Further, the near-infrared shielding ultrafine particle dispersion body of Comparative Example 3 obtained using the composite tungsten oxide ultrafine particles (A) of Comparative Example 3 contained too much weather resistance improver (C) of the present invention.

It was confirmed that the near-infrared shielding ultrafine particle dispersion body of Comparative Example 3 had a large haze value, with cloudy appearance.

TABLE 1

| | | Firing condition Thermal plasma method | | | | | |
|---|---|---|---|---|---|---|---|
| | Raw material | Plasma temperature [K] | a [kW] | Sheath gas (L/min) | Carrier gas (Ar) (L/min) | Plasma gas (Ar) (L/min) | b (g/min) |
| Example 1 | $Cs_2CO_3$ & $H_2WO_4$ | 10000~15000 | 40 | Ar55•He5 | 9 | 30 | 50 |
| Example 2 | $Cs_2CO_3$ & $H_2WO_4$ | 10000~15000 | 40 | Ar55•He5 | 8 | 30 | 25 |
| Example 3 | $Cs_2CO_3$ & $H_2WO_4$ | 10000~15000 | 40 | Ar55•He5 | 6 | 30 | 25 |
| Example 4 | $Cs_2CO_3$ & $H_2WO_4$ | 10000~15000 | 40 | Ar55•He5 | 9 | 45 | 50 |
| Example 5 | $Cs_2CO_3$ & $H_2WO_4$ | 10000~15000 | 40 | Ar55•He5 | 9 | 30 | 50 |
| Example 6 | $Cs_2CO_3$ & $H_2WO_4$ | 10000~15000 | 40 | Ar55•He5 | 6 | 45 | 25 |
| Example 7 | $Cs_{0.33}WO_3$ | 10000~15000 | 40 | Ar55•He5 | 9 | 30 | 50 |
| Example 8 | $Cs_{0.33}WO_3$ | 10000~15000 | 40 | Ar55•He5 | 6 | 30 | 25 |
| Example 9 | $Rb_2CO_3$ & $H_2WO_4$ | 10000~15000 | 40 | Ar55•He5 | 9 | 30 | 50 |
| Example 10-16 | The same as Example 3 | | | | | | |
| Com. Ex. 1 | $Cs_2CO_3$ & $H_2WO_4$ | 10000~15000 | 40 | Ar55•He5 | 3 | 30 | 15 |
| Com. Ex. 2 | $Cs_2CO_3$ & $H_2WO_4$ | 10000~15000 | 40 | Ar55•He5 | 9 | 15 | 50 |
| Com. Ex. 3 | $Cs_2CO_3$ & $H_2WO_4$ | 10000~15000 | 15 | Ar55•He5 | 9 | 30 | 50 |

Com. Ex. = Comparative Example
a = High frequency power
b = Raw material feed rate

TABLE 2

| | Composition of near-infrared shielding ultrafine particle dispersion liquid | | | Composition of coating liquid for forming near-infrared shielding layer | | | | | | |
|---|---|---|---|---|---|---|---|---|---|---|
| | Addition amount of solvent MIBK [Parts by mass] | Addition amount of composite tungsten ultrafine particles [Parts by mass] | Addition amount of dispersant [Parts by mass] | a [Parts by mass] | UV curable resin Type | UV curable resin Addition amount [Parts by mass] | Weather resistance improver Type | Weather resistance improver Addition amount [Parts by mass] | Type | Addition amount [Parts by mass] |
| Example 1 | 64 | 20 | 16 | 100 | UV3701 | 86 | B-1 | 60 | — | — |
| Example 2 | 64 | 20 | 16 | 100 | UV3701 | 50 | B-1 | 60 | — | — |
| Example 3 | 64 | 20 | 16 | 100 | UV3701 | 50 | B-1 | 60 | — | — |
| Example 4 | 64 | 20 | 16 | 100 | UV3701 | 50 | B-1 | 60 | — | — |
| Example 5 | 64 | 28 | 16 | 100 | UV3701 | 50 | B-1 | 60 | — | — |
| Example 6 | 64 | 20 | 16 | 100 | UV3701 | 50 | B-1 | 60 | — | — |
| Example 7 | 64 | 20 | 16 | 100 | UV3701 | 50 | B-1 | 60 | — | — |
| Example 8 | 64 | 20 | 16 | 100 | UV3701 | 50 | B-1 | 60 | — | — |
| Example 9 | 64 | 20 | 16 | 100 | UV3701 | 50 | B-1 | 60 | — | — |
| Example 10 | The same as Example 3 | | | | | | B-1 | 2 | — | — |
| Example 11 | | | | | | | B-1 | 200 | — | — |
| Example 12 | | | | | | | B-2 | 80 | — | — |
| Example 13 | | | | | | | B-3 | 60 | — | — |
| Example 14 | | | | | | | B-1 | 30 | B-2 | 30 |
| Example 15 | | | | | | | B-1 | 30 | B-3 | 30 |
| Example 16 | | | | | | | B-2 | 30 | B-3 | 30 |
| Com. Ex. 1 | 64 | 20 | 16 | 100 | UV3701 | 50 | — | — | — | — |
| Com. Ex. 2 | 64 | 20 | 16 | 100 | UV3701 | 50 | B-2 | 1 | — | — |
| Com. Ex. 3 | 64 | 20 | 16 | 100 | UV3701 | 50 | B-3 | 400 | — | — |

Com. Ex. = Comparative Example
a = Near-infrared shielding ultrafine particle dispersion liquid
B-1: benzotriazole UV absorber 2-(2-hydroxy-5-methylphenyl)benxotriazole, Sumisorb 200 manufactured by Sumitomo Metal Mining Co. Ltd.
B-2: benzophenone UV absorber, 2-hydroxy-4-n-octoxylbenzophenone, Sumisorb 130 manufactured by Sumitomo Metal Mining Co. Ltd.
B-3: Triazine-based ultraviolet absorber [2,4-bis[2-hydroxy-4-butoxyphenyl]-5-(2,4-dibutoxyphenyl)-1,3-5-triazine (BASF) Tinvin 480 manufactured by BASF.

TABLE 3

| | Crystal system | Heterogenous phase | M/W motor ratio | BET [m²/g] | Volatile component (mass %) | Peak top intensity a (count) | Peak top intensity b (count) | Peak top intensity on (220) plane of standard sample | Peak top intensity ratio after dispersion | 2θ at peak position [°] | Dispersed particle size in dispersion liquid [nm] | Crystallite size after dispersion [nm] |
|---|---|---|---|---|---|---|---|---|---|---|---|---|
| Example 1 | C | None | 0.29 | 60.0 | 1.6 | 4200 | 3000 | 19800 | 0.15 | 27.8 | 70 | 16.9 |
| Example 2 | C | None | 0.29 | 51.6 | 1.5 | 4700 | 3400 | 19800 | 0.17 | 27.8 | 80 | 19.5 |
| Example 3 | C | None | 0.29 | 41.6 | 1.4 | 5400 | 4200 | 19800 | 0.21 | 27.8 | 80 | 21.1 |
| Example 4 | C | None | 0.29 | 54.8 | 1.6 | 4500 | 3100 | 19800 | 0.16 | 27.8 | 80 | 18.7 |
| Example 5 | C | None | 0.29 | 57.8 | 1.6 | 4400 | 3100 | 19890 | 0.16 | 27.8 | 79 | 17.9 |
| Example 6 | C | None | 0.30 | 37.8 | 1.3 | 5800 | 4500 | 19800 | 0.23 | 27.8 | 80 | 28.2 |
| Example 7 | C | None | 0.29 | 44.7 | 1.4 | 5200 | 4000 | 19800 | 0.20 | 27.8 | 80 | 23.0 |
| Example 8 | C | None | 0.30 | 39.3 | 1.3 | 5700 | 4400 | 19800 | 0.22 | 27.8 | 80 | 29.0 |
| Example 9 | R | None | 0.32 | 62.5 | — | 4000 | 3000 | 19800 | 0.15 | 27.9 | 70 | 17.2 |
| Example 10-16 | The same as Example 3 | | | | | | | | | | | |
| Com. Ex. 1 | C | None | 0.29 | 90.2 | — | 1000 | 1000 | 19800 | 0.05 | 27.8 | 80 | 8.0 |
| Com. Ex. 2 | C | None | 0.29 | 86.0 | — | 1100 | 1100 | 19800 | 0.06 | 27.8 | 80 | 9.2 |
| Com. Ex. 3 | C | $WO_2$&W | 0.29 | 43.0 | — | 3200 | 2400 | 19800 | 0.12 | 27.8 | 80 | 22.9 |

Com. Ex. = Compartive Example
a = Raw material powder
b = After dispersion
C = Hexagonal $Cs_{0.33}WO_3$
R = Hexagonal $Rb_{0.33}WO_3$

TABLE 4

| | | Dispersed particle size in dispersion body (nm) | Optical properties of near-infrared shielding laminated structure | | | | | | |
|---|---|---|---|---|---|---|---|---|---|
| | | | Before ultraviolet irradiation test | | | | After ultraviolet irradiation test | | |
| | Substrate | | Visible light transmittance (%) | Solar transmittance (%) | Haze value (%) | Blue haze | Visible light transmittance (%) | Solar transmittance (%) | Haze value (%) |
| Example 1 | Polyester film | 17 | 70 | 38.7 | 1.3 | Absent | 69 | 38.0 | 1.3 |
| Example 2 | Polyester film | 19 | 70 | 38.5 | 1.2 | Absent | 70 | 38.2 | 1.2 |
| Example 3 | Polyester film | 21 | 70 | 38.3 | 1.2 | Absent | 70 | 37.9 | 1.3 |
| Example 4 | Polyester film | 19 | 70 | 38.5 | 1.2 | Absent | 70 | 38.2 | 1.2 |
| Example 5 | Polyester film | 18 | 70 | 38.1 | 1.2 | Absent | 70 | 37.7 | 1.3 |
| Example 6 | Polyester film | 22 | 70 | 38.2 | 1.4 | Absent | 70 | 37.8 | 1.4 |
| Example 7 | Polyester film | 22 | 70 | 38.5 | 1.2 | Absent | 70 | 38.1 | 1.2 |
| Example 8 | Polyester film | 29 | 70 | 38.7 | 1.4 | Absent | 70 | 38.3 | 1.4 |
| Example 9 | Polyester film | 17 | 70 | 39.3 | 1.3 | Absent | 69 | 38.5 | 1.3 |
| Example 10 | The same as Example 3 | | 70 | 38.2 | 1.3 | Absent | 69 | 37.6 | 1.3 |
| Example 11 | | | 70 | 38.1 | 1.3 | Absent | 69 | 37.6 | 1.4 |
| Example 12 | | | 70 | 38.4 | 1.2 | Absent | 69 | 37.7 | 1.2 |
| Example 13 | | | 70 | 38.3 | 1.5 | Absent | 69 | 37.4 | 1.5 |
| Example 14 | | | 70 | 38.1 | 1.5 | Absent | 70 | 37.7 | 1.6 |
| Example 15 | | | 70 | 38.5 | 1.4 | Absent | 69 | 37.5 | 1.5 |
| Example 15 | | | 70 | 38.4 | 1.4 | Absent | 69 | 37.6 | 1.6 |
| Com. Ex. 1 | Polyester film | 20 | 70 | 38.3 | 1.2 | Absent | 65 | 34.0 | 1.3 |
| Com. Ex. 2 | Polyester film | 23 | 70 | 38.4 | 1.3 | Absent | 67 | 34.9 | 1.4 |
| Com. Ex. 3 | Polyester film | 23 | 70 | 38.6 | 10.3 | Present | 69 | 37.6 | 10.2 |

Com. Ex. = Comparative Example

DESCRIPTION OF SIGNS AND NUMERALS

1 Thermal plasma
2 High frequency coil
3 Sheath gas feed nozzle
4 Plasma gas feed nozzle
5 Raw material powder feed nozzle
6 Reaction vessel
7 Filter

The invention claimed is:

1. A near-infrared shielding ultrafine particle dispersion body in which ultra-fine particles having near-infrared shielding properties are dispersed in a solid medium,
wherein the ultrafine particles are composite tungsten oxide ultrafine particles represented by a general formula MxWyOz in which M is one or more elements selected from the group consisting of H, He, Li, Na, Rb, Cs, alkaline earth metal, rare earth element, Mg, Zr, Cr, Mn, Fe, Ru, Co, Rh, Jr, Ni, Pd, Pt, Cu, Ag, Au, Zn, Cd, Al, Ga, In, Tl, Si, Ge, Sn, Pb, Sb, B, F, P, S, Se, Br, Te, Ti, Nb, V, Mo, Ta, Re, Be, Hf, Os, Bi, and I, W is tungsten, O is oxygen, x, y, and z satisfy $0.001 \leq x/y \leq 1$, $2.0 < z/y \leq 3.0$, and have an XRD peak top intensity ratio value of 0.13 or more based on an XRD peak intensity ratio value of 1 on plane (220) of a silicon powder standard sample,
a dispersed particle size of the composite tungsten oxide ultrafine particles is 10 nm or more and 200 nm or less,
a crystallite size of the composite tungsten oxide ultrafine particles is 10 nm or more and 200 nm or less,
each of the composite tungsten oxide ultrafine particles is made of a single crystal in which a volume ratio of an amorphous phase in the composite tungsten oxide ultrafine particles is less than 50%,
the solid medium contains a resin binder and a weather resistance improver,
the weather resistance improver includes at least one selected from the group consisting of a benzotriazole-based UV absorber, a triazine-based UV absorber, and a benzophenone-based UV absorber, and
a content of a volatile component contained in the composite tungsten oxide ultrafine particles is 1.3 mass % or more and 1.6 mass % or less.

2. The near-infrared shielding ultrafine particle dispersion body according to claim 1, wherein the composite tungsten oxide ultrafine particles include a hexagonal crystal structure.

3. The near-infrared shielding ultrafine particle dispersion body according to claim 1, wherein an addition amount of the weather resistance improver is 0.1 to 10 parts by mass with respect to 1 part by mass of the composite tungsten oxide ultrafine particles.

4. The near-infrared shielding ultrafine particle dispersion body according to claim 1, containing the composite tungsten oxide ultrafine particles in an amount of 0.001 mass % to 80 mass %.

5. The near-infrared shielding ultrafine particle dispersion body according to claim 1, wherein the resin binder is a binder resin of one of resins selected from a resin group consisting of polyethylene terephthalate resin, polycarbonate resin, acrylic resin, styrene resin, polyamide resin, polyethylene resin, vinyl chloride resin, olefin resin, epoxy resin, polyimide resin, fluorine resin, ethylene/vinyl acetate copolymer resin, polyvinyl acetal resin, ionomer resin, and silicone resin, or a mixture of two or more resins selected from the above resin group, or a copolymer of two or more resins selected from the above resin group.

6. The near-infrared shielding ultrafine particle dispersion body according to claim 1, wherein the near-infrared shielding ultrafine particle dispersion body is in a sheet form, a board form, or a film form.

7. The near-infrared shielding ultrafine particle dispersion body according to claim 1, wherein the near-infrared shielding ultrafine particle dispersion body is provided as a coating layer having a thickness of 1 μm or more and 10 μm or less on a transparent substrate.

8. The near-infrared shielding ultrafine particle dispersion body according to claim 7, wherein the transparent substrate is a polyester film, or glass.

9. A near-infrared shielding intermediate film, constituting an interlayer in a near-infrared shielding laminated structure including two or more transparent substrates and the interlayer sandwiched between the two or more transparent substrates, wherein the near-infrared shielding ultrafine particle dispersion body of claim 1 is used as the intermediate film.

10. A near-infrared shielding laminated structure, including two or more transparent substrates and an interlayer sandwiched between the two or more transparent substrates, wherein the interlayer includes one or more intermediate films, and at least one of the intermediate films is the near-infrared shielding intermediate film of claim 9, and the transparent substrate is any one selected from the group consisting of plate glass, plastic, and plastic containing fine particles having a near-infrared shielding function.

11. The near-infrared shielding laminated structure according to claim 10, wherein at least one layer of the intermediate film constituting the interlayer is the near-infrared shielding intermediate film, and the intermediate film is sandwiched between two intermediate films made of a resin sheet formed using polyvinyl acetal resin or ethylene/vinyl acetate copolymer resin.

12. The near-infrared shielding laminated structure according to claim 10, wherein a thickness of the near-infrared shielding intermediate film is 50 μm or more and 1000 μm or less.

13. The near-infrared shielding laminated structure according to claim 10, wherein a haze value is 5% or less when a visible light transmittance is set to 70% or more.

14. A method for producing the near-infrared shielding ultrafine particle dispersion body according to claim 1, the method comprising: dispersing the composite tungsten oxide ultrafine particles in the solid medium.

15. The method for producing a near-infrared shielding ultrafine particle dispersion body according to claim 14, wherein the composite tungsten oxide ultrafine particles include a hexagonal crystal structure.

16. The near-infrared shielding ultrafine particle dispersion body according to claim 1, wherein a BET specific surface area of the composite tungsten oxide ultrafine particles is 30.0 m$^2$/g or more and 200.0 m$^2$/g or less.

17. The near-infrared shielding ultrafine particle dispersion body according to claim 16, wherein the BET specific surface area of the composite tungsten oxide ultrafine particles is 37.8 m$^2$/g or more and 62.5 m$^2$/g or less.

* * * * *